(12) United States Patent
Polo et al.

(10) Patent No.: US 9,827,487 B2
(45) Date of Patent: Nov. 28, 2017

(54) INTERACTIVE AUGMENTED REALITY USING A SELF-PROPELLED DEVICE

(71) Applicant: Sphero, Inc., Boulder, CO (US)

(72) Inventors: Fabrizio Polo, Boulder, CO (US); Jonathan Carroll, Boulder, CO (US); Skylar Castator-Smith, Boulder, CO (US); Ross Ingram, Boulder, CO (US)

(73) Assignee: Sphero, Inc., Boulder, CO (US)

( * ) Notice: Subject to any disclaimer, the term of this patent is extended or adjusted under 35 U.S.C. 154(b) by 495 days.

(21) Appl. No.: 14/054,636

(22) Filed: Oct. 15, 2013

(65) Prior Publication Data

US 2014/0051513 A1 Feb. 20, 2014

Related U.S. Application Data

(63) Continuation-in-part of application No. 13/894,247, filed on May 14, 2013, now Pat. No. 9,280,717.

(60) Provisional application No. 61/646,716, filed on May 14, 2012.

(51) Int. Cl.
| | |
|---|---|
| *A63F 13/00* | (2014.01) |
| *G06K 9/32* | (2006.01) |
| *G06T 11/00* | (2006.01) |
| *A63F 13/65* | (2014.01) |
| *A63F 13/327* | (2014.01) |
| *G06T 7/246* | (2017.01) |
| *G06T 7/269* | (2017.01) |

(52) U.S. Cl.
CPC ............ *A63F 13/00* (2013.01); *A63F 13/327* (2014.09); *A63F 13/65* (2014.09); *G06K 9/3241* (2013.01); *G06T 7/246* (2017.01); *G06T 7/269* (2017.01); *G06T 11/00* (2013.01)

(58) Field of Classification Search
CPC ... G06K 9/3241; G06T 7/2033; G06T 7/2066; G06T 7/0083; G06T 7/0077; G06T 11/00; A63F 13/00; A63F 13/327; A63F 13/65
See application file for complete search history.

(56) References Cited

U.S. PATENT DOCUMENTS

| | | |
|---|---|---|
| 90,546 A | 5/1869 | Huntington |
| 933,623 A | 9/1909 | Cecil |
| 1,263,262 A | 4/1918 | McFaul |
| | (Continued) | |

FOREIGN PATENT DOCUMENTS

| | | |
|---|---|---|
| CN | 1302717 | 7/2001 |
| CN | 1765595 | 5/2006 |
| | (Continued) | |

OTHER PUBLICATIONS

US 9,342,073, 05/2016, Berstein et al. (withdrawn)

(Continued)

*Primary Examiner* — Manav Seth
(74) *Attorney, Agent, or Firm* — Merchant & Gould P.C.

(57) ABSTRACT

A method is disclosed for operating a mobile computing device. The method may include a communication link between the mobile computing device and a second computing device. The second computing device may provide a virtual environment for the mobile computing device. Furthermore, the mobile computing device may allow a user to control a self-propelled device, which may be rendered as a virtual entity upon the virtual environment.

24 Claims, 6 Drawing Sheets

(56) References Cited

U.S. PATENT DOCUMENTS

| | | | |
|---|---|---|---|
| 2,796,601 | A | 11/1956 | Hagopian |
| 2,949,696 | A | 8/1960 | Easterling |
| 2,977,714 | A | 4/1961 | Gibson |
| 3,313,365 | A | 4/1967 | Jackson |
| 3,667,156 | A | 6/1972 | Tomiyama |
| 3,683,216 | A | 8/1972 | Post |
| 3,821,995 | A | 7/1974 | Aghnides |
| 4,310,987 | A | 1/1982 | Chieffo |
| 4,519,466 | A | 5/1985 | Shiraishi |
| 4,541,814 | A | 9/1985 | Martin |
| 4,601,675 | A | 7/1986 | Robinson |
| 4,733,737 | A | 3/1988 | Falamak |
| 4,897,070 | A | 1/1990 | Wagstaff |
| 4,996,468 | A | 2/1991 | Field et al. |
| 5,087,000 | A | 2/1992 | Suto |
| 5,213,176 | A | 5/1993 | Oroku et al. |
| 5,297,981 | A | 3/1994 | Maxim et al. |
| 5,342,051 | A | 8/1994 | Rankin et al. |
| 5,413,345 | A | 5/1995 | Nauck |
| 5,439,408 | A | 8/1995 | Wilkinson |
| 5,489,099 | A | 2/1996 | Rankin et al. |
| 5,513,854 | A | 5/1996 | Daver |
| 5,595,121 | A | 1/1997 | Elliot |
| 5,628,232 | A | 5/1997 | Bakholdin et al. |
| 5,644,139 | A | 7/1997 | Allen et al. |
| 5,676,582 | A | 10/1997 | Lin |
| 5,739,657 | A | 4/1998 | Takayama et al. |
| 5,759,083 | A | 6/1998 | Polumbaum et al. |
| 5,780,826 | A | 7/1998 | Hareyama et al. |
| 5,793,142 | A | 9/1998 | Richard |
| 5,871,386 | A | 2/1999 | Bart et al. |
| 5,952,796 | A | 9/1999 | Colgate et al. |
| 5,953,056 | A | 9/1999 | Tucker |
| 6,144,128 | A | 11/2000 | Rosen |
| 6,227,933 | B1 | 5/2001 | Michaud et al. |
| 6,246,927 | B1 | 6/2001 | Dratman |
| 6,315,667 | B1 | 11/2001 | Steinhart |
| 6,320,352 | B2 | 11/2001 | Terazoe |
| 6,390,213 | B1 | 5/2002 | Bleicher |
| 6,439,956 | B1 | 7/2002 | Ho |
| 6,449,010 | B1 | 9/2002 | Tucker |
| 6,456,938 | B1 | 9/2002 | Barnard |
| 6,458,008 | B1 | 10/2002 | Hyneman |
| 6,459,955 | B1 | 10/2002 | Bartsch et al. |
| 6,502,657 | B2 | 1/2003 | Kerrebrock et al. |
| 6,535,793 | B2 * | 3/2003 | Allard .................. B25J 9/1689 318/628 |
| 6,573,883 | B1 | 6/2003 | Bartlett |
| 6,584,376 | B1 | 6/2003 | Van Kammer |
| 6,615,109 | B1 | 9/2003 | Matsuoka et al. |
| 6,764,373 | B1 | 7/2004 | Osawa et al. |
| 6,785,590 | B2 | 8/2004 | Kasuga et al. |
| 6,786,795 | B1 | 9/2004 | Mullaney et al. |
| 6,789,768 | B1 | 9/2004 | Kalisch |
| 6,856,696 | B1 | 2/2005 | Ajioka |
| 6,901,110 | B1 | 5/2005 | Tsougarakis et al. |
| 6,902,464 | B1 | 6/2005 | Lee |
| 6,945,843 | B1 | 9/2005 | Motosko |
| 6,980,956 | B1 | 12/2005 | Takagi et al. |
| 7,058,205 | B2 | 6/2006 | Jepson et al. |
| 7,069,113 | B2 | 6/2006 | Matsuoka et al. |
| 7,130,741 | B2 | 10/2006 | Bodin et al. |
| 7,170,047 | B2 | 1/2007 | Pal |
| 7,173,604 | B2 | 2/2007 | Marvit et al. |
| 7,258,591 | B2 | 8/2007 | Xu et al. |
| 7,283,647 | B2 | 10/2007 | McNitt |
| 7,292,711 | B2 | 11/2007 | Kiraly et al. |
| 7,298,869 | B1 | 11/2007 | Abernathy |
| 7,324,663 | B2 | 1/2008 | Kiraly |
| 7,328,671 | B2 | 2/2008 | Kates |
| 7,340,077 | B2 | 3/2008 | Gokturk et al. |
| 7,340,344 | B2 | 3/2008 | Chappell |
| 7,344,430 | B2 | 3/2008 | Hasty et al. |
| 7,409,924 | B2 | 8/2008 | Kates |
| 7,424,867 | B2 | 9/2008 | Kates |
| 7,432,718 | B2 | 10/2008 | Ishihara et al. |
| 7,463,001 | B2 | 12/2008 | Tsurukawa |
| 7,501,780 | B2 | 3/2009 | Yamamoto |
| 7,526,362 | B2 | 4/2009 | Kim et al. |
| 7,542,597 | B2 | 6/2009 | Rahn et al. |
| 7,639,874 | B2 | 12/2009 | Bushell et al. |
| 7,699,683 | B2 | 4/2010 | Caspi |
| 7,702,131 | B2 | 4/2010 | Chinen et al. |
| 7,714,880 | B2 | 5/2010 | Johnson |
| 7,714,895 | B2 * | 5/2010 | Pretlove .................. B25J 9/1656 348/115 |
| 7,726,422 | B2 | 6/2010 | Sun et al. |
| 7,755,660 | B2 | 7/2010 | Nejikovsky et al. |
| 7,822,507 | B2 | 10/2010 | Ishihara et al. |
| 7,847,504 | B2 | 12/2010 | Hollis |
| 7,853,357 | B2 | 12/2010 | Sawada et al. |
| 7,899,226 | B2 | 3/2011 | Pescatore et al. |
| 7,957,837 | B2 | 6/2011 | Ziegler et al. |
| 7,979,162 | B2 | 7/2011 | Niemela et al. |
| 8,025,551 | B2 | 9/2011 | Torres et al. |
| 8,038,504 | B1 | 10/2011 | Wong |
| 8,077,981 | B2 | 12/2011 | Elangovan et al. |
| 8,099,189 | B2 | 1/2012 | Kaznov et al. |
| 8,128,450 | B2 | 3/2012 | Imai |
| 8,128,500 | B1 | 3/2012 | Borst et al. |
| 8,142,287 | B2 | 3/2012 | Podoloff |
| 8,144,118 | B2 | 3/2012 | Hildreth |
| 8,180,436 | B2 | 5/2012 | Boyden et al. |
| 8,190,295 | B1 * | 5/2012 | Garretson ............ G05D 1/0038 700/245 |
| 8,195,333 | B2 | 6/2012 | Ziegler et al. |
| 8,197,298 | B2 | 6/2012 | Willett |
| 8,210,289 | B1 | 7/2012 | Lu et al. |
| 8,258,917 | B2 | 9/2012 | Cai et al. |
| 8,269,447 | B2 | 9/2012 | Smoot et al. |
| 8,274,406 | B2 | 9/2012 | Karlsson et al. |
| 8,275,544 | B1 | 9/2012 | Wells et al. |
| 8,326,469 | B2 | 12/2012 | Phillips et al. |
| 8,330,639 | B2 | 12/2012 | Wong et al. |
| 8,352,643 | B2 | 1/2013 | Birnbaum et al. |
| 8,355,818 | B2 | 1/2013 | Nielsen et al. |
| 8,364,136 | B2 | 1/2013 | Hoffberg et al. |
| 8,376,756 | B2 | 2/2013 | Robb |
| 8,392,065 | B2 | 3/2013 | Tolstedt et al. |
| 8,396,611 | B2 | 3/2013 | Phillips et al. |
| 8,400,619 | B1 | 3/2013 | Bachrach et al. |
| 8,417,384 | B2 | 4/2013 | Togawa et al. |
| 8,430,192 | B2 | 4/2013 | Gillett |
| 8,442,661 | B1 | 5/2013 | Blackwell et al. |
| 8,456,298 | B2 | 6/2013 | Valtonen |
| 8,459,383 | B1 | 6/2013 | Burget |
| 8,522,902 | B2 | 9/2013 | Gomi et al. |
| 8,540,038 | B1 | 9/2013 | Ullman |
| 8,571,781 | B2 | 10/2013 | Bernstein et al. |
| 8,577,595 | B2 | 11/2013 | Zhao et al. |
| 8,600,600 | B2 | 12/2013 | Jung |
| 8,670,889 | B2 | 3/2014 | Kaznov |
| 8,672,062 | B2 | 3/2014 | Schroll et al. |
| 8,751,063 | B2 | 6/2014 | Bernstein et al. |
| 8,766,983 | B2 | 7/2014 | Marks et al. |
| 8,788,130 | B1 | 7/2014 | Tran et al. |
| 8,805,947 | B1 * | 8/2014 | Kuzkin .................. H04L 67/40 709/208 |
| 8,838,273 | B2 | 9/2014 | Hvass et al. |
| 8,862,301 | B2 | 10/2014 | Araki et al. |
| 8,882,559 | B2 * | 11/2014 | Fessenmaier .......... A63H 30/04 446/321 |
| 8,885,882 | B1 | 11/2014 | Yin et al. |
| 9,011,197 | B2 | 4/2015 | Smoot et al. |
| 9,014,848 | B2 | 4/2015 | Farlow et al. |
| 9,041,622 | B2 * | 5/2015 | McCulloch .......... G02B 27/017 345/7 |
| 9,090,214 | B2 | 7/2015 | Bernstein et al. |
| 9,114,838 | B2 | 8/2015 | Bernstein et al. |
| 9,150,263 | B2 | 10/2015 | Bernstein et al. |
| 9,193,404 | B2 | 11/2015 | Bernstein et al. |
| 9,211,920 | B1 | 12/2015 | Bernstein et al. |
| 9,218,316 | B2 | 12/2015 | Bernstein et al. |
| 9,280,717 | B2 | 3/2016 | Polo et al. |

(56) References Cited

U.S. PATENT DOCUMENTS

| | | |
|---|---|---|
| 9,290,220 B2 | 3/2016 | Bernstein et al. |
| 9,292,758 B2 | 3/2016 | Polo et al. |
| 9,389,612 B2 | 7/2016 | Bernstein et al. |
| 9,394,016 B2 | 7/2016 | Bernstein et al. |
| 9,395,725 B2 | 7/2016 | Berstein et al. |
| 9,429,940 B2 | 8/2016 | Bernstein et al. |
| 9,457,730 B2 | 10/2016 | Berstein et al. |
| 9,481,410 B2 | 11/2016 | Bernstein et al. |
| 9,483,876 B2 | 11/2016 | Polo et al. |
| 9,558,612 B2 | 1/2017 | Lyons |
| 2002/0011368 A1 | 1/2002 | Berg |
| 2002/0036104 A1 | 3/2002 | Kerrebrock et al. |
| 2002/0142701 A1 | 10/2002 | Rosenberg |
| 2003/0093182 A1 | 5/2003 | Yokoyama |
| 2003/0118217 A1 | 6/2003 | Kondo et al. |
| 2003/0179176 A1 | 9/2003 | Waterston |
| 2003/0216834 A1 | 11/2003 | Allard |
| 2003/0216835 A1 | 11/2003 | Wakui |
| 2004/0002843 A1 | 1/2004 | Robarts et al. |
| 2004/0015266 A1 | 1/2004 | Skoog |
| 2004/0168837 A1 | 9/2004 | Michaud et al. |
| 2004/0182614 A1 | 9/2004 | Wakui |
| 2004/0186623 A1 | 9/2004 | Dooley et al. |
| 2004/0192163 A1 | 9/2004 | Siegel |
| 2004/0198159 A1 | 10/2004 | Xu et al. |
| 2005/0004723 A1 | 1/2005 | Duggan et al. |
| 2005/0186884 A1 | 8/2005 | Evans |
| 2005/0216186 A1 | 9/2005 | Dorfman |
| 2005/0226192 A1 | 10/2005 | Red et al. |
| 2005/0264472 A1 | 12/2005 | Rast |
| 2006/0080802 A1 | 4/2006 | Tani |
| 2006/0095158 A1 | 5/2006 | Lee et al. |
| 2006/0101465 A1 | 5/2006 | Kato et al. |
| 2006/0132318 A1 | 6/2006 | Shimizu |
| 2006/0164261 A1 | 7/2006 | Stiffler |
| 2006/0241812 A1 | 10/2006 | Juang |
| 2006/0271251 A1 | 11/2006 | Hopkins |
| 2007/0034734 A1 | 2/2007 | Yoeli |
| 2007/0085706 A1 | 4/2007 | Feyereisen et al. |
| 2007/0112462 A1 | 5/2007 | Kim et al. |
| 2007/0150103 A1 | 6/2007 | Im |
| 2007/0162862 A1* | 7/2007 | Ogasawara ......... H04L 12/2602 715/751 |
| 2007/0192910 A1 | 8/2007 | Vu |
| 2007/0249422 A1 | 10/2007 | Podoloff |
| 2007/0259592 A1 | 11/2007 | Imai et al. |
| 2007/0282484 A1 | 12/2007 | Chung et al. |
| 2008/0009965 A1 | 1/2008 | Bruemmer et al. |
| 2008/0012518 A1 | 1/2008 | Yamamoto |
| 2008/0033641 A1 | 2/2008 | Medalia |
| 2008/0077284 A1 | 3/2008 | Swope |
| 2008/0082208 A1 | 4/2008 | Hong |
| 2008/0086241 A1 | 4/2008 | Phillips et al. |
| 2008/0121097 A1 | 5/2008 | Rudakevych et al. |
| 2008/0174268 A1 | 7/2008 | Koo et al. |
| 2008/0174448 A1 | 7/2008 | Hudson |
| 2008/0182479 A1 | 7/2008 | Elliott et al. |
| 2008/0240507 A1 | 10/2008 | Niwa et al. |
| 2008/0263628 A1 | 10/2008 | Norman et al. |
| 2008/0267450 A1 | 10/2008 | Sugimoto et al. |
| 2008/0269949 A1 | 10/2008 | Norman et al. |
| 2009/0018712 A1* | 1/2009 | Duncan ............... G09B 19/167 701/2 |
| 2009/0028439 A1 | 1/2009 | Elangovan et al. |
| 2009/0033623 A1 | 2/2009 | Lin |
| 2009/0055019 A1 | 2/2009 | Stiehl et al. |
| 2009/0057238 A1 | 3/2009 | Garti |
| 2009/0069084 A1* | 3/2009 | Reece ................... A63F 13/10 463/32 |
| 2009/0073034 A1 | 3/2009 | Linsky et al. |
| 2009/0078484 A1 | 3/2009 | Kocijan |
| 2009/0081923 A1 | 3/2009 | Dooley et al. |
| 2009/0133467 A1 | 5/2009 | Mori et al. |
| 2009/0138232 A1 | 5/2009 | Fuwa |
| 2009/0153349 A1 | 6/2009 | Lin |
| 2009/0157221 A1 | 6/2009 | Sip |
| 2009/0161983 A1 | 6/2009 | Ciurea |
| 2009/0164638 A1 | 6/2009 | Jang |
| 2009/0171516 A1 | 7/2009 | Reich |
| 2009/0187299 A1 | 7/2009 | Fregene |
| 2009/0198371 A1 | 8/2009 | Emanuel et al. |
| 2009/0204261 A1 | 8/2009 | Strand et al. |
| 2009/0222148 A1 | 9/2009 | Knotts et al. |
| 2009/0226035 A1 | 9/2009 | Iihoshi et al. |
| 2009/0245656 A1 | 10/2009 | Hu |
| 2009/0256822 A1 | 10/2009 | Amireh et al. |
| 2009/0262074 A1 | 10/2009 | Nasiri et al. |
| 2009/0265671 A1 | 10/2009 | Sachs et al. |
| 2009/0278932 A1 | 11/2009 | Yi |
| 2009/0284553 A1 | 11/2009 | Seydoux |
| 2009/0316012 A1 | 12/2009 | Matos |
| 2010/0002909 A1 | 1/2010 | Lefevre et al. |
| 2010/0004798 A1 | 1/2010 | Bodin et al. |
| 2010/0010669 A1 | 1/2010 | Lee et al. |
| 2010/0010672 A1 | 1/2010 | Wang et al. |
| 2010/0032224 A1 | 2/2010 | Liu |
| 2010/0063652 A1 | 3/2010 | Anderson |
| 2010/0066676 A1 | 3/2010 | Kramer et al. |
| 2010/0084513 A1 | 4/2010 | Gariepy et al. |
| 2010/0090661 A1 | 4/2010 | Chen et al. |
| 2010/0106344 A1 | 4/2010 | Edwards et al. |
| 2010/0145236 A1 | 6/2010 | Greenberg et al. |
| 2010/0169098 A1 | 7/2010 | Patch |
| 2010/0172287 A1 | 7/2010 | Krieter |
| 2010/0178982 A1* | 7/2010 | Ehrman ............... A63F 7/0664 463/37 |
| 2010/0183195 A1 | 7/2010 | Sharma |
| 2010/0234993 A1 | 9/2010 | Seelinger et al. |
| 2010/0241289 A1 | 9/2010 | Sandberg |
| 2010/0261526 A1 | 10/2010 | Anderson et al. |
| 2010/0264756 A1 | 10/2010 | Lee et al. |
| 2010/0283988 A1 | 11/2010 | Mosier et al. |
| 2010/0302247 A1 | 12/2010 | Perez et al. |
| 2010/0302359 A1 | 12/2010 | Adams |
| 2010/0305778 A1 | 12/2010 | Dorneich et al. |
| 2010/0305781 A1 | 12/2010 | Felix |
| 2010/0312917 A1 | 12/2010 | Allport |
| 2010/0324753 A1 | 12/2010 | Okumatsu |
| 2011/0003640 A9 | 1/2011 | Ehrman |
| 2011/0018731 A1 | 1/2011 | Linsky et al. |
| 2011/0018794 A1 | 1/2011 | Linsky et al. |
| 2011/0022196 A1 | 1/2011 | Linsky et al. |
| 2011/0035054 A1 | 2/2011 | Gal et al. |
| 2011/0050940 A1 | 3/2011 | Lanz et al. |
| 2011/0060492 A1 | 3/2011 | Kaznov |
| 2011/0065488 A1 | 3/2011 | Okamura et al. |
| 2011/0071652 A1 | 3/2011 | Brown et al. |
| 2011/0071702 A1 | 3/2011 | Wang et al. |
| 2011/0082566 A1 | 4/2011 | Herr et al. |
| 2011/0087371 A1 | 4/2011 | Sandberg et al. |
| 2011/0138416 A1 | 6/2011 | Kang et al. |
| 2011/0153885 A1 | 6/2011 | Mak et al. |
| 2011/0156943 A1 | 6/2011 | Wong et al. |
| 2011/0174565 A1 | 7/2011 | Rochat |
| 2011/0183732 A1 | 7/2011 | Block et al. |
| 2011/0184590 A1 | 7/2011 | Duggan et al. |
| 2011/0201362 A1 | 8/2011 | Bregman-Amitai et al. |
| 2011/0132671 A1 | 9/2011 | Lee et al. |
| 2011/0213278 A1 | 9/2011 | Horak et al. |
| 2011/0231013 A1 | 9/2011 | Smoot et al. |
| 2011/0234488 A1 | 9/2011 | Ge et al. |
| 2011/0237324 A1 | 9/2011 | Clavin et al. |
| 2011/0246904 A1* | 10/2011 | Pinto ..................... G06F 9/4445 715/740 |
| 2011/0249074 A1 | 10/2011 | Cranfill |
| 2011/0250967 A1 | 10/2011 | Kulas |
| 2011/0273379 A1 | 11/2011 | Chen et al. |
| 2011/0283223 A1 | 11/2011 | Vaittinen et al. |
| 2011/0285349 A1 | 11/2011 | Widmer et al. |
| 2011/0286631 A1 | 11/2011 | Wagner et al. |
| 2011/0291926 A1 | 12/2011 | Gokturk et al. |
| 2011/0304633 A1 | 12/2011 | Beardsley |
| 2011/0308873 A1 | 12/2011 | Kim et al. |
| 2011/0313568 A1 | 12/2011 | Blackwell et al. |

(56) References Cited

U.S. PATENT DOCUMENTS

| | | |
|---|---|---|
| 2011/0320830 A1 | 12/2011 | Ito |
| 2012/0009845 A1* | 1/2012 | Schmelzer ............ A63H 17/00 |
| | | 446/431 |
| 2012/0035799 A1 | 2/2012 | Ehrmann |
| 2012/0043149 A1 | 2/2012 | Kim et al. |
| 2012/0043172 A1 | 2/2012 | Ichikawa |
| 2012/0059520 A1 | 3/2012 | Kossett |
| 2012/0065747 A1 | 3/2012 | Brown et al. |
| 2012/0072023 A1 | 3/2012 | Ota |
| 2012/0083945 A1 | 4/2012 | Oakley et al. |
| 2012/0083962 A1 | 4/2012 | Sato et al. |
| 2012/0099756 A1 | 4/2012 | Sherman et al. |
| 2012/0100915 A1 | 4/2012 | Margalit et al. |
| 2012/0106783 A1 | 5/2012 | Chang et al. |
| 2012/0112553 A1 | 5/2012 | Stoner |
| 2012/0129605 A1* | 5/2012 | Livet ............... G06K 9/00355 |
| | | 463/39 |
| 2012/0143482 A1 | 6/2012 | Goossen et al. |
| 2012/0146775 A1 | 6/2012 | Kudo et al. |
| 2012/0149359 A1 | 6/2012 | Huang |
| 2012/0167014 A1 | 6/2012 | Joo et al. |
| 2012/0168240 A1 | 7/2012 | Wilson |
| 2012/0168241 A1 | 7/2012 | Bernstein et al. |
| 2012/0173018 A1 | 7/2012 | Allen et al. |
| 2012/0173047 A1 | 7/2012 | Bernstein et al. |
| 2012/0173049 A1 | 7/2012 | Bernstein et al. |
| 2012/0173050 A1 | 7/2012 | Berstein et al. |
| 2012/0185115 A1 | 7/2012 | Dean |
| 2012/0193154 A1 | 8/2012 | Wellborn et al. |
| 2012/0197439 A1 | 8/2012 | Wang et al. |
| 2012/0200380 A1 | 8/2012 | Kocijan |
| 2012/0215355 A1 | 8/2012 | Bewley et al. |
| 2012/0229647 A1 | 9/2012 | Calman et al. |
| 2012/0232977 A1 | 9/2012 | Calman et al. |
| 2012/0233015 A1 | 9/2012 | Calman et al. |
| 2012/0240077 A1 | 9/2012 | Vaittinen et al. |
| 2012/0244969 A1 | 9/2012 | Binder |
| 2012/0258645 A1 | 10/2012 | Cheng |
| 2012/0262002 A1 | 10/2012 | Widmer et al. |
| 2012/0263154 A1 | 10/2012 | Blanchflower et al. |
| 2012/0291926 A1 | 11/2012 | Misra et al. |
| 2012/0293548 A1 | 11/2012 | Perez et al. |
| 2012/0298049 A1 | 11/2012 | Cook et al. |
| 2012/0298430 A1 | 11/2012 | Schroll et al. |
| 2012/0302129 A1 | 11/2012 | Persaud |
| 2012/0306850 A1 | 12/2012 | Balan et al. |
| 2012/0307001 A1 | 12/2012 | Osako et al. |
| 2012/0309261 A1 | 12/2012 | Boman |
| 2012/0311810 A1 | 12/2012 | Gilbert et al. |
| 2013/0022274 A1 | 1/2013 | Lawrence Ashok Inigo |
| 2013/0040533 A1 | 2/2013 | Miller |
| 2013/0050069 A1 | 2/2013 | Ota |
| 2013/0065482 A1 | 3/2013 | Trickett |
| 2013/0105239 A1 | 5/2013 | Fung |
| 2013/0109272 A1 | 5/2013 | Rindlishbacher |
| 2013/0113307 A1 | 5/2013 | Kim et al. |
| 2013/0143482 A1 | 6/2013 | Regier |
| 2013/0173089 A1 | 7/2013 | Bernstein et al. |
| 2013/0200207 A1 | 8/2013 | Pongratz |
| 2013/0265225 A1 | 10/2013 | Nasiri et al. |
| 2013/0293584 A1 | 11/2013 | Anderson |
| 2013/0307875 A1 | 11/2013 | Anderson |
| 2014/0008496 A1 | 1/2014 | Ye |
| 2014/0015493 A1 | 1/2014 | Wirz et al. |
| 2014/0120887 A1 | 5/2014 | Huang |
| 2014/0207280 A1 | 7/2014 | Duffley |
| 2014/0238762 A1 | 8/2014 | Berberian et al. |
| 2014/0249697 A1 | 9/2014 | Fredriksson |
| 2014/0371954 A1 | 12/2014 | Lee et al. |
| 2015/0091697 A1 | 4/2015 | Takayasu |
| 2015/0175202 A1 | 6/2015 | MacGregor |
| 2015/0209664 A1 | 7/2015 | Haseltine |
| 2015/0268666 A1 | 9/2015 | Wang et al. |
| 2016/0033967 A1 | 2/2016 | Bernstein et al. |
| 2016/0054734 A1 | 2/2016 | Bernstein et al. |
| 2016/0090133 A1 | 3/2016 | Bernstein et al. |
| 2016/0148367 A1 | 5/2016 | Polo et al. |
| 2016/0202696 A1 | 7/2016 | Bernstein et al. |
| 2016/0246299 A1 | 8/2016 | Berberian et al. |
| 2016/0282871 A1 | 9/2016 | Berstein et al. |
| 2016/0291591 A1 | 10/2016 | Bernstein et al. |
| 2016/0291595 A1 | 10/2016 | Halloran |
| 2016/0349748 A1 | 12/2016 | Bernstein et al. |
| 2017/0080352 A1 | 3/2017 | Bernstein et al. |
| 2017/0092009 A1 | 3/2017 | Polo et al. |

FOREIGN PATENT DOCUMENTS

| | | |
|---|---|---|
| CN | 101154110 | 4/2008 |
| CN | 201147642 | 11/2008 |
| CN | 201220111 | 4/2009 |
| CN | 101426664 | 5/2009 |
| CN | 102060060 | 5/2011 |
| CN | 102421629 | 4/2012 |
| DE | 19809168 | 9/1999 |
| DE | 101 46 862 A1 | 5/2002 |
| DE | 102011108689 | 4/2012 |
| EP | 1944573 | 7/2008 |
| EP | 102010042395 | 4/2012 |
| GB | 2309650 | 8/1997 |
| GB | 2319756 | 6/1998 |
| JP | 03182290 A | 8/1991 |
| JP | H07-308462 | 11/1995 |
| JP | 09254838 A | 9/1997 |
| JP | 2000218578 A | 8/2000 |
| JP | 2001153650 | 6/2001 |
| JP | 2002345706 | 12/2002 |
| JP | 2004042246 | 2/2004 |
| JP | 2004148439 | 5/2004 |
| JP | 2004260917 | 9/2004 |
| JP | 2007072802 | 3/2007 |
| JP | 2007213353 | 8/2007 |
| JP | 2008-040725 A | 2/2008 |
| JP | 2011530756 | 12/2011 |
| JP | 2012022457 | 2/2012 |
| JP | 4893862 | 3/2012 |
| KR | 10-2008-040725 A | 8/2008 |
| KR | 10-2008-0073626 A | 8/2008 |
| KR | 10-2008-0092595 A | 10/2008 |
| KR | 10-2009-0000013 A | 1/2009 |
| KR | 20100001408 | 1/2010 |
| KR | 10-0969873 B1 | 7/2010 |
| TW | 20105393 | 4/2010 |
| WO | WO-97/25239 A1 | 7/1997 |
| WO | WO-2006/049559 A1 | 5/2006 |
| WO | WO-2012/094349 A2 | 7/2012 |
| WO | 2012103525 | 8/2012 |

OTHER PUBLICATIONS

Hashimoto et al., Nov. 2011, "TouchMe: An Augmented Reality Based Remote Robot Manipulation" (pp. 61-66).*

Arioui et al., 2011 AACC Publication, "Force Feedback Stabilization for Remote Control of an Assistive Mobile Robot" (pp. 4898-4903).*

Osorio et al., 2010 IDMME Publication, "Mobile Robots Design and Implementation: From Virtual Simulation to Real Robots" (pp. 1-6).*

Simsarian et al, 1996 Publication, "Achieving virtual presence with a semi-autonomous robot through a multi-reality and speech control interface". (pp. 50-63).*

Diolaiti et al., 2002 IEEE Publication, "Tele-operation of a Mobile Robot Through Haptic Feedback" (pp. 1-6).*

U.S. Appl. No. 61/362,005, filed Jul. 7, 2010, Schmelzer, Richard.

Liu, Dalian et al., "Motion Control of a Spherical Mobile Robot by Feedback Linearization," 7th WC on IC&A, Jun. 27, 2008, Chongqing, China, pp. 965-970. 6 pages.

Shu, Guanghui et al., "Motion Control of Spherical Robot Based on Conservation of Angular Momentum," IEEE Intl Conf on Mechatronics & Automation, Aug. 12, Changchun, China, pp. 599-604. 6 pages.

(56) References Cited

OTHER PUBLICATIONS

Joshi, Vrunda et al., "Design, modeling and controllability of a spherical mobile robot", 13th Natl Conf on Mechanisms & Machines (NaCoMM07) IISc, Bangalore, India, Dec. 13, 2007, pp. 1-6.
Harmo, Panu et al., "Moving Eye—Interactive Telepresence over Internet with a Ball Shaped Mobile Robot," Automation Tech Lab, Finland, Oct. 2, 2001. 6 pages. http://automation.tkk.fi/files/tervetaas/MovingEye4.pdf.
Halme, Aarne, et al., "Motion Control of a Spherical Mobile Robot", Helsinki, IEEE AMC '1996, pp. 259-264. 6 pages.
Non-Final Office Action mailed Apr. 29, 2013, for related U.S. Appl. No. 13/342,874, filed Jan. 3, 2012, 47 pages.
Final Office Action mailed Jun. 6, 2014, for related U.S. Appl. No. 13/342,908, filed Jan. 3, 2012, 32 pages.
U.S. Appl. No. 61/362,005, Schmelzer, filed Jul. 7, 2010, 10 pages.
European Search Report and European Search Opinion mailed Nov. 6, 2014, for related EP Application No. 12731945.7 filed Jul. 26, 2013. 7 pages.
Non-Final Office Action mailed Dec. 20, 2013, for related U.S. Appl. No. 13/342,908, filed Jan. 3, 2012, 28 pages.
International Search Report and the Written Opinion mailed Dec. 17, 2014, for Application No. PCT/US2014/059973 filed Sep. 10, 2014, 13 pages.
Non-Final Office Action mailed Oct. 16, 2012, for related U.S. Appl. No. 13/342,853, filed Feb. 19, 2013, 10 pages.
Non-Final Office Action mailed Apr. 9, 2013, for related U.S. Appl. No. 13/342,892, filed Jan. 3, 2013, 19 pages.
Notification of Transmittal of International Search Report and the Written Opinion of the International Searching Authority mailed Dec. 3, 2012, for related PCT Application No. PCT/US2012/020115 filed Jan. 3, 2012, 11 pages.
Non-Final Office Action mailed Apr. 16, 2013, for related U.S. Appl. No. 13/342,884, filed Jan. 3, 2013, 20 pages.
Notice of Allowance mailed Apr. 19, 2013, for related U.S. Appl. No. 13/342,853, filed Feb. 19, 2013, 11 pages.
Non-Final Office Action mailed May 13, 2013, for related U.S. Appl. No. 13/342,874, filed Jan. 3, 2012, 17 pages.
Non-Final Office Action mailed Jun. 3, 2013, for related U.S. Appl. No. 13/342,914, filed Jan. 3, 2012, 32 pages.
Koshiyama et al., Machine Translation for JP 2000-218578, Aug. 8, 2000, 11 Pages.
Non-Final Office Action mailed Jun. 13, 2013, for related U.S. Appl. No. 13/342,908, filed Jan. 3, 2012, 36 pages.
GearBox Ball Prototype Jun. 29, 2010, Pictures from Video [online]. Orbotix, Inc., Jun. 30, 2010, 91 pages. Retrieved from the internet:<URL: http://www.youtube.com/watch?v=qRBM7bAaXpU>.
Notification of Transmittal of International Search Report and the Written Opinion of the International Searching Authority mailed Aug. 28, 2013, for related PCT Application No. PCT/US2013/041023 filed May 14, 2013, 11 pages.
Notification of Transmittal of International Search Report and the Written Opinion of the International Searching Authority mailed Oct. 15, 2013, for related PCT Application No. PCT/US2013/050327 filed Jul. 12, 2013, 13 pages.
Final Office Action mailed Nov. 15, 2013, for related U.S. Appl. No. 13/342,892, filed Jan. 3, 2013, 21 pages.
Final Office Action mailed Nov. 18, 2013, for related U.S. Appl. No. 13/342,884, filed Jan. 3, 2013, 19 pages.
Final Office Action mailed Nov. 18, 2013, for related U.S. Appl. No. 13/342,874, filed Jan. 3, 2012, 21 pages.
Final Office Action mailed Nov. 13, 2013, for related U.S. Appl. No. 13/342,914, filed Jan. 3, 2012, 30 pages.
U.S. Appl. No. 13/894,247, Amendment and Response dated Aug. 13, 2015, 9 pages.
U.S. Appl. No. 13/894,247, Notice of Allowance dated Oct. 29, 2015, 7 pages.
U.S. Appl. No. 13/894,247, Office Action dated Jun. 12, 2015, 14 pages.
U.S. Appl. No. 14/035,841 Amendment and Response dated Sep. 14, 2015, 12 pages.
U.S. Appl. No. 14/035,841, Notice of Allowance dated Sep. 25, 2015, 5 pages.
U.S. Appl. No. 14/035,841, Notice of Allowance dated Oct. 7, 2015, 2 pages.
U.S. Appl. No. 14/035,841, Notice of Allowance dated Oct. 16, 2015, 2 pages.
U.S. Appl. No. 14/035,841, Office Action dated May 13, 2015, 12 pages.
U.S. Appl. No. 14/137,954, Amendment and Response dated Aug. 3, 2015, 14 pages.
U.S. Appl. No. 14/137,954, Amendment and Response dated Feb. 5, 2016, 11 pages.
U.S. Appl. No. 14/137,954, Amendment and Response dated Jun. 6, 2016, 12 pages.
U.S. Appl. No. 14/137,954, Notice of Allowance dated Sep. 26, 2016, 8 pages.
U.S. Appl. No. 14/137,954, Office Action dated May 4, 2015, 26 pages.
U.S. Appl. No. 14/137,954, Office Action dated Nov. 5, 2015, 31 pages.
U.S. Appl. No. 14/137,954, Office Action dated Apr. 12, 2016, 27 pages.
U.S. Appl. No. 14/148,541, Amendment and Response dated Sep. 4, 2015, 14 pages.
U.S. Appl. No. 14/148,541, Office Action dated Jun. 4, 2015, 18 pages.
U.S. Appl. No. 14/148,541, Notice of Allowance dated Nov. 18, 2015, 11 pages.
U.S. Appl. No. 14/261,288, Amendment and Response dated Nov. 5, 2015, 12 pages.
U.S. Appl. No. 14/261,288, Notice of Allowance dated Nov. 23, 2015, 10 pages.
U.S. Appl. No. 14/261,288, Office Action dated Jul. 7, 2015, 13 pages.
U.S. Appl. No. 14/271,203, Advisory Action dated Mar. 2, 2016, 3 pages.
U.S. Appl. No. 14/271,203, Amendment and Response dated Oct. 26, 2015, 10 pages.
U.S. Appl. No. 14/271,203, Amendment and Response dated Feb 23, 2016, 9 pages.
U.S. Appl. No. 14/271,203, Amendment and Response dated Mar. 11, 2016, 9 pages.
U.S. Appl. No. 14/271,203, Amendment and Response dated Jun. 6, 2016, 9 pages.
U.S. Appl. No. 14/271,203, Office Action dated Jul. 27, 2015, 11 pages.
U.S. Appl. No. 14/271,203, Office Action dated Dec. 21, 2015, 10 pages.
U.S. Appl. No. 14/271,203, Office Action dated Apr. 4, 2016, 10 pages.
U.S. Appl. No. 14/271,203, Office Action dated Aug. 1, 2016, 17 pages.
U.S. Appl. No. 14/459,235, Notice of Allowance dated Mar. 6, 2015, 9 pages.
U.S. Appl. No. 14/459,235, Notice of Allowance dated Jun. 25, 2015, 7 pages.
U.S. Appl. No. 14/663,446, Notice of Allowance dated Sep. 25, 2015, 9 pages.
U.S. Appl. No. 14/691,349, Amendment and Response dated Aug. 28, 2015, 11 pages.
U.S. Appl. No. 14/691,349, Amendment and Response dated Jan. 26, 2016, 6 pages.
U.S. Appl. No. 14/691,349, Notice of Allowance dated Mar. 4, 2016, 5 pages.
U.S. Appl. No. 14/691,349, Notice of Allowance dated Jun. 6, 2016, 5 pages.
U.S. Appl. No. 14/691,349, Office Action dated Jul. 17, 2015, 9 pages.
U.S. Appl. No. 14/832,801, Amendment and Response dated Feb. 5, 2016, 10 pages.

(56) References Cited

OTHER PUBLICATIONS

U.S. Appl. No. 14/832,801, Amendment and Response dated Feb. 12, 2016, 8 pages.
U.S. Appl. No. 14/832,801, Notice of Allowance dated Mar. 22, 2016, 10 pages.
U.S. Appl. No. 14/832,801, Notice of Allowance dated May 11, 2016, 5 pages.
U.S. Appl. No. 14/832,801, Office Action dated Nov. 6, 2015, 6 pages.
U.S. Appl. No. 14/839,610, Amendment and Response dated Feb. 18, 2016, 11 pages.
U.S. Appl. No. 14/839,610, Notice of Allowance dated Mar. 23, 2016, 16 pages.
U.S. Appl. No. 14/839,610, Office Action dated Nov. 18, 2015, 7 pages.
U.S. Appl. No. 14/850,910, Amendment and Response dated Feb. 18, 2016, 7 pages.
U.S. Appl. No. 14/850,910, Notice of Allowance dated Mar. 17, 2016, 11 pages.
U.S. Appl. No. 14/850,910, Office Action dated Nov. 25, 2015, 8 pages.
U.S. Appl. No. 14/968,594, Amendment and Response dated Apr. 5, 2016, 7 pages.
U.S. Appl. No. 14/968,594, Notice of Allowance dated Jul. 19, 2016, 6 pages.
U.S. Appl. No. 14/968,594, Office Action dated Feb. 3, 2016, 5 pages.
U.S. Appl. No. 14/975,510, Amendment and Response dated May 12, 2016, 8 pages.
U.S. Appl. No. 14/975,510, Notice of Allowance dated Jul. 7, 2016, 5 pages.
U.S. Appl. No. 14/975,510, Office Action dated Feb. 12, 2016, 6 pages.
U.S. Appl. No. 15/017,211, Notice of Allowance dated Jul. 5, 2016, 10 pages.
U.S. Appl. No. 15/017,211, Notice of Allowance dated Aug. 8, 2016, 4 pages.
U.S. Appl. No. 15/232,490, Office Action dated Sep. 23, 2016, 5 pages.
European Search Report in Application 13790911.5, dated Oct. 14, 2016, 10 pages.
Loy et al., "Fast Radial Symmetry for Detecing Points of Interest", IEEE Transactions on Pattern Analysis and Machine Intelligence, IEEE Computer Society, USA, vol. 25, No. 8, Aug. 1, 2003, 15 pages.
European Search Report in Application 14795148.7, dated Dec. 7, 2016, 7 pages.
Korean Office Action in Application 10-2014-7034020, dated Dec. 23, 2016, 11 pages.
U.S. Appl. No. 13/342,914, Decision on Appeal dated Feb. 1, 2017, 8 pages.
U.S. Appl. No. 14/884,632, Office Action dated Jan. 25, 2017, 7 pages.
U.S. Appl. No. 14/271,203, Amendment and Response dated Feb. 1, 2017, 12 pages.
"Roll, Pitch, and Yaw, How Things Fly", How Things Fly website, https://howthingsfly.si.edu/flight-dynamics/roll-pitch-and-yaw.
Chinese Office Action in Application 201380036857.2, dated Jun. 29, 2016, 10 pages.
Chinese Office Action in Application 201620300686, dated Sep. 9, 2016, 3 pages.
European Search Report in Application 13817382.2, dated Mar. 11, 2016, 8 pages.
Korean Office Action in Application 10-2015-7003642, dated Nov. 28, 2016, 13 pages.
PCT International Search Report in PCT/US2014/037013, dated Aug. 26, 2014, 8 pages.
PCT International Search Report in PCT/US2014/068606, dated Mar. 2, 2015, 7 pages.
PCT International Search Report in PCT/US2015/030877, dated Aug. 13, 2015, 5 pages.
PCT International Search Report in PCT/US2015/044885, dated Oct. 29, 2015, 7 pages.
U.S. Appl. No. 13/342,853, Amendment and Response dated Feb. 19, 2013, 7 pages.
U.S. Appl. No. 13/342,853, Notice of Allowance dated Jun. 20, 2013, 6 pages.
U.S. Appl. No. 13/342,874, Amendment and Response dated Sep. 13, 2013, 21 pages.
U.S. Appl. No. 13/342,874, Amendment and Response dated Jan. 21, 2014, 13 pages.
U.S. Appl. No. 13/342,874, Amendment and Response dated Jul. 14, 2014, 13 pages.
U.S. Appl. No. 13/342,874, Amendment and Response dated Mar. 5, 2015, 11 pages.
U.S. Appl. No. 13/342,874, Amendment and Response dated Jul. 7, 2015, 9 pages.
U.S. Appl. No. 13/342,874, Notice of Allowance dated Jul. 24, 2015, 18 pages.
U.S. Appl. No. 13/342,874, Notice of Allowance dated Aug. 11, 2015, 3 pages.
U.S. Appl. No. 13/342,874, Office Action dated Sep. 4, 2014, 16 pages.
U.S. Appl. No. 13/342,874, Office Action dated Apr. 7, 2015, 8 pages.
U.S. Appl. No. 13/342,884, Amendment and Response dated Sep. 16, 2013, 32 pages.
U.S. Appl. No. 13/342,884, Amendment and Response dated Jan. 21, 2014, 11 pages.
U.S. Appl. No. 13/342,884, Notice of Allowance dated Feb. 19, 2014, 14 pages.
U.S. Appl. No. 13/342,892, Amendment and Response dated Sep. 9, 2013, 27 pages.
U.S. Appl. No. 13/342,892, Amendment and Response dated Feb. 18, 2014, 12 pages.
U.S. Appl. No. 13/342,892, Appeal Brief dated Jul. 17, 2014, 30 pages.
U.S. Appl. No. 13/342,892, Office Action dated Nov. 15, 2013, 18 pages.
U.S. Appl. No. 13/342,892, Response to Appeal Brief dated Aug. 6, 2014, 16 pages.
U.S. Appl. No. 13/342,908, Advisory Action dated Aug. 11, 2014, 3 pages.
U.S. Appl. No. 13/342,908, Advisory Action dated Sep. 18, 2014, 4 pages.
U.S. Appl. No. 13/342,908, Amendment and Response dated Oct. 15, 2013, 32 pages.
U.S. Appl. No. 13/342,908, Amendment and Response dated Mar. 20, 2014, 21 pages.
U.S. Appl. No. 13/342,908, Amendment and Response dated Aug. 8, 2014, 13 pages.
U.S. Appl. No. 13/342,908, Amendment and Response dated Sep. 5, 2014, 18 pages.
U.S. Appl. No. 13/342,908, Amendment and Response dated Apr. 6, 2015, 12 pages.
U.S. Appl. No. 13/342,908, Notice of Allowance dated Apr. 29, 2015, 12 pages.
U.S. Appl. No. 13/342,908, Supplemental Amendment and Response dated Apr. 17, 2015, 10 pages.
U.S. Appl. No. 13/342,914, Advisory Action dated Feb. 13, 2014, 3 pages.
U.S. Appl. No. 13/342,914, Amendment and Response dated Sep. 3, 2013, 24 pages.
U.S. Appl. No. 13/342,914, Amendment and Response dated Feb. 3, 2014, 12 pages.
U.S. Appl. No. 13/342,914, Appeal Brief dated Jul. 3, 2014, 27 pages.
U.S. Appl. No. 13/342,914, Response to Appeal Brief dated Jul. 29, 2014, 10 pages.
U.S. Appl. No. 13/549,097, Amendment and Response dated Mar. 24, 2015, 14 pages.

(56) References Cited

OTHER PUBLICATIONS

U.S. Appl. No. 13/549,097, Amendment and Response dated Jan. 22, 2016, 16 pages.
U.S. Appl. No. 13/549,097, Office Action dated Dec. 26, 2014, 20 pages.
U.S. Appl. No. 13/549,097, Office Action dated Oct. 22, 2015, 20 pages.
U.S. Appl. No. 13/549,097, Office Action dated Oct. 4, 2016, 22 pages.
U.S. Appl. No. 13/766,455, Amendment and Response dated Jul. 15, 2015, 11 pages.
U.S. Appl. No. 13/766,455, Notice of Allowance dated Aug. 20, 2015, 15 pages.
U.S. Appl. No. 13/766,455, Office Action dated Apr. 15, 2015, 9 pages.
Airplane Flying Handbook (FAA-H-8083-3B) Chapter 10, Figure, 10-2, https://www.faa.gov/regulations_policies/handbooks_manuals/aviation/airplane_handbook/media/12_afh_ch10.pdf, 10 pages, 2004, 10 pages.
Chinese Office Action in Application 201380036857.2, dated Mar. 22, 2017, 11 pages.
Chinese Office Action in Application 201620300686.0, dated Feb. 3, 2016, 5 pages.
Chinese Office Action in Application 201702030180700, dated Feb. 7, 2017, 8 pages.
Curriculum of Dr. Jason Janet cited in IPR2017-01272, filed Apr. 20, 2017, 6 pages.
Declaration of Dr. Jason Janet cited in IPR2017-01272, filed Apr. 20, 2017, 79 pages.
European Extended Search Report in Application 14795148.7, dated Apr. 5, 2017, 12 pages.
Gene F. Franklin, J. David Powell, Abbas Emami-Naeini, Feedback Control of Dynamic Systems, Fourth Edition, Prentice Hall, 2002, 28 pages.
Hashem Ghariblu and Hadi Mohammadi, Structure and Dynamic Modeling of a Spherical Robot, 8th International Symposium on Mechatronics and its Applications, 2012, 5 pages.
Hiroyuki Fujita, A Decade of MEMS and its Future, Proceedings IEEE the Tenth Annual International Workshop on Micro Electra Mechanical Systems, 1997, 8 pages.
How a Small Robotics Startup Helped Disney Bring BB-8 to Life, US Chamber of Commerce (https://www.uschamber.com/above-thefold/how-small-robotics-startup-helped-disney-bring-bb-8-life), Retrieved on Mar. 31, 2017, 6 pages.
Japanese Office Action in Application 2015-512768, dated Dec. 6, 2016, 9 pages.
Japanese Office Action in Application 2015-521853, dated Feb. 14, 2017, 6 pages.
Martyn Williams, Sony unwraps high-tech 'healing' ball, CNN.com, published Mar. 28, 2002, http://edition.cnn.com/2002/TECH/ptech/03/28/robodex.healing.ball.idg/?related, retreived on Apr. 4, 2017, 1 page.
Masato Ishikawa, Ryohei Kitayoshi, and Toshiharu Sugie, Dynamic rolling locomotion by spherical mobile robots considering its generalized momentum, Proceedings of SICE Annual Conference 2010 2311 (2010), 6 pages.
Meet BB-8: The New Droid in the Lives of Star Wars Buffs, Wharton School of the University of Pennsylvania (Nov. 13, 2015) (http://knowledge.wharton.upenn.edu/article/meet-bb-8-the-newdroid-in-the-lives-of-star-wars-buffs/), Retrieved on Mar. 31, 2017, 3 pages.
PCT International Preliminary Report on Patentability in PCT/US2015/030877, dated Feb. 23, 2017, 5 pages.
PCT International Preliminary Report on Patentability in PCT/US2015/044885, dated Feb. 23, 2017, 5 pages.
Qiang Zhan, Yao Cai, and Caixia Yan, Design, Analysis and Experiments of an Omni-Directional Spherical Robot, IEEE International Conference on Robotics and Automation 4921, 2011, 6 pages.
Randall Munroe, New Pet, http://xkcd.com/413/, Retrieved from Internet Archive (http://web.archive.org/ web/20080701080435/http://xkcd.com/413/) (2008), Retrieved on Apr. 13, 2017, 3 pages.
U.S. Appl. No. 13/549,097, Amendment and Response dated Mar. 14, 2017, 13 pages.
U.S. Appl. No. 14/137,954, Notice of Allowance dated Mar. 8, 2017, 8 pages.
U.S. Appl. No. 14/271,203, Office Action dated Feb. 21, 2017, 12 pages.
U.S. Appl. No. 14/884,632, Amendment and Response dated Apr. 19, 2017, 3 pages.
U.S. Appl. No. 14/933,827, Office Action dated Apr. 21, 2017, 7 pages.
U.S. Appl. No. 15/040,331, Office Action dated Apr. 13, 2017, 10 pages.
U.S. Appl. No. 15/232,490, Amendment and Response dated Feb. 22, 2017, 3 pages.
U.S. Appl. No. 15/232,490, Office Action dated Mar. 17, 2017, 4 pages.
Kialing Lv and Minglu Zhang, Robot Control Based on Voice Command, IEEE International Conference on Automation and Logistics 2490, 2008, 5 pages.
Chinese Office Action in Application 201620300686, dated May 2, 2017, 2 pages. (No English Translation).
U.S. Appl. No. 15/281,478, Office Action dated May 5, 2017, 5 pages.
U.S. Appl. No. 14/884,632, Notice of Allowance dated May 15, 2017, 8 pages.
U.S. Appl. No. 15/146,631, Office Action dated May 16, 2017, 11 pages.
U.S. Appl. No. 13/342,892, Board Decision dated May 5, 2017, 8 pages.
European Office Action in Application 13817383.8, dated Apr. 20, 2017, 6 pages.
Chinese Office Action in Application 201480029695.4, dated May 27, 2017, 22 pages.
Chinese Office Action in Application 201510463007.1, dated May 31, 2017, 8 pages.
European Extended Search Report in Application 14853882.0, dated Jun. 22, 2017, 6 pages.
Korean Office Action in Application 10-2014-7034020, dated Jun. 30, 2017, 11 pages.
U.S. Appl. No. 15/232,490, Amendment and Response dated Jul. 10, 2017, 3 pages.
U.S. Appl. No. 15/040,331, Amendment and Response dated Jul. 10, 2017, 10 pages.
U.S. Appl. No. 14/884,632, Supplemental Notice of Allowance dated Jun. 1, 2017, 2 pages.
U.S. Appl. No. 14/137,954, Notice of Allowance dated Jun. 29, 2017, 8 pages.
U.S. Appl. No. 13/342,892, Notice of Allowance dated Jun. 7, 2017, 7 pages.
U.S. Appl. No. 13/342,892, Supplemental Notice of Allowance dated Jun. 29, 2017, 2 pages.
U.S. Appl. No. 13/549,097, Office Action dated Jun. 26, 2017, 30 pages.
Chinese Notice of Allowance in Application 201380036857.2, dated Aug. 1, 2017, 4 pages.
Chinese Office Action in Application 201510463336.6, dated Jul. 17, 2017, 5 pages. (No English Translation).
Korean Notice of Allowance in Application 10-2015-7003642, dated Jul. 25, 2017, 4 pages.
U.S. Appl. No. 13/549,097, Advisory Action dated Sep. 22, 2017, 2 pages.
U.S. Appl. No. 15/146,631, Office Action dated Sep. 21, 2017, 14 pages.
U.S. Appl. No. 15/232,490, Notice of Allowance dated Sep. 21, 2017, 7 pages.
U.S. Appl. No. 13/342,892, Supplemental Notice of Allowance dated Jul. 26, 2017, 2 pages.
U.S. Appl. No. 13/549,097, Amendment and Response dated Aug. 25, 2017, 11 pages.

(56) References Cited

OTHER PUBLICATIONS

U.S. Appl. No. 14/137,954, Supplemental Notice of Allowance dated Jul. 27, 2017, 2 pages.
U.S. Appl. No. 14/271,203, Amendment and Response dated Aug. 18, 2017, 11 pages.
U.S. Appl. No. 14/884,632, Supplemental Notice of Allowance dated Jul. 28, 2017, 2 pages.
U.S. Appl. No. 15/040,331, Notice of Allowance dated Aug. 1, 2017, 9 pages.
U.S. Appl. No. 15/146,631, Amendment and Response dated Aug. 18, 2017, 10 pages.
U.S. Appl. No. 15/177,809, Office Action dated Aug. 16, 2017, 6 pages.
U.S. Appl. No. 15/180,485, Office Action dated Aug. 17, 2017, 9 pages.
U.S. Appl. No. 15/232,490, Notice of Allowance dated Aug. 10, 2017, 5 pages.
U.S. Appl. No. 15/281,478, Amendment and Response dated Sep. 5, 2017, 8 pages.
Wright's Brothers Propulsion System, Smithsonian national Air and Museum, retrieved , retreived Aug. 17, 2017, https://airandspace.si.edu/exhibitions/wright-brothers/online/fly/1903/propulsion.cfm, 5 pages.

\* cited by examiner

US 9,827,487 B2

INTERACTIVE AUGMENTED REALITY USING A SELF-PROPELLED DEVICE

RELATED APPLICATION

This application is a continuation-in-part of U.S. application Ser. No. 13/894,247 (now U.S. Pat. No. 9,280,717), filed May 14, 2013, entitled "OPERATING A COMPUTING DEVICE BY DETECTING ROUNDED OBJECTS IN AN IMAGE", which claims priority to U.S. Provisional Patent Application Ser. No. 61/646,716, filed May 14, 2012, entitled "OPERATING A COMPUTING DEVICE BY DETECTING ROUNDED OBJECTS IN AN IMAGE", the disclosures of which are hereby incorporated by reference in their entireties.

BACKGROUND OF THE INVENTION

With the improvement of mobile computing devices, users are able to use their devices for a variety of different purposes. Not only can a user operate a smartphone for making phone calls and for browsing the internet, for example, but a user can use his or her smartphone to perform a variety of different tasks.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

Figure 1:
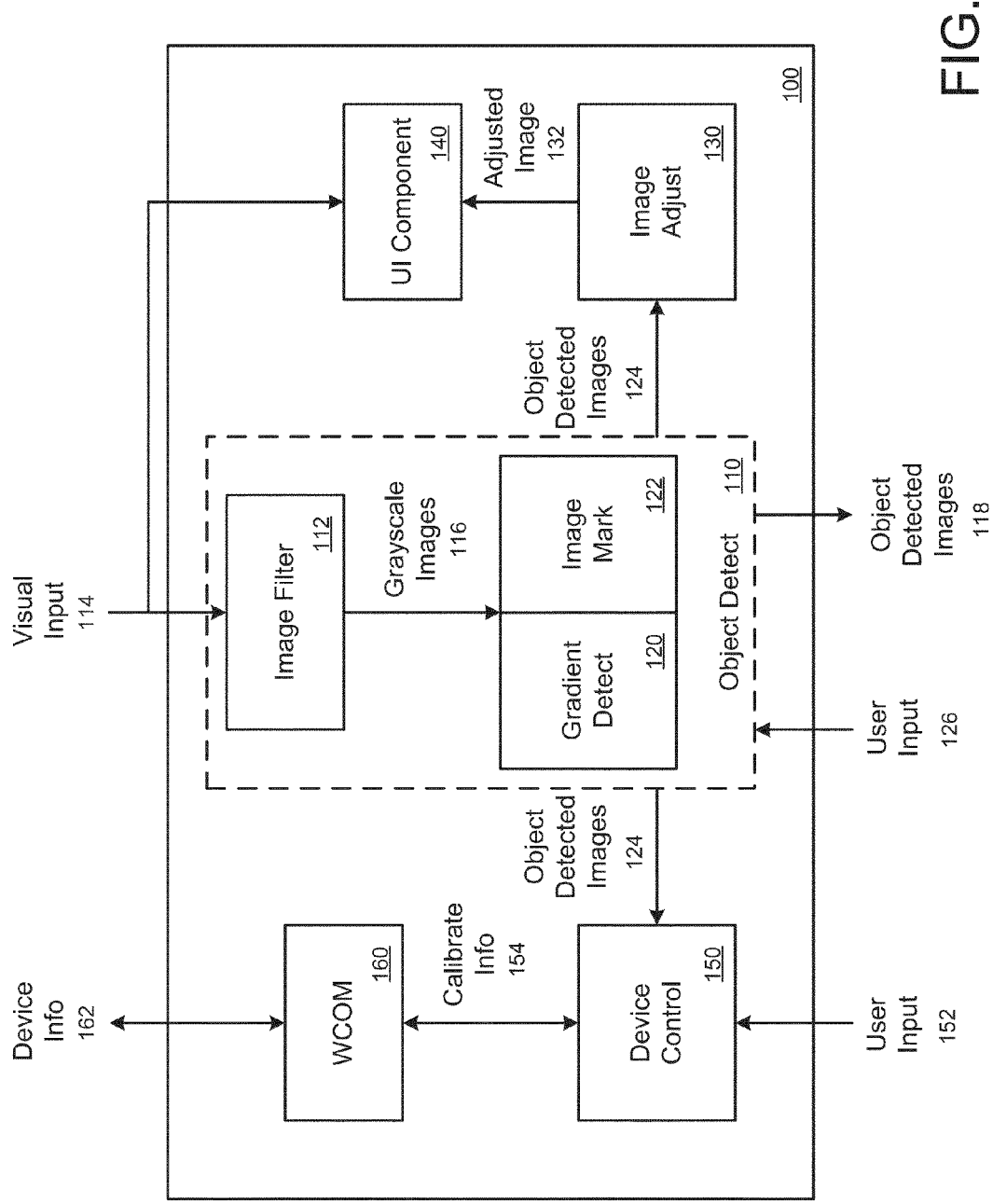
FIG. 1 illustrates an example system for operating a computing device, under an embodiment.

Embodiments described herein provide for a computing device that can detect one or more rounded objects (e.g., a ball, a self-propelled device having a spherical housing) in an image and track the detected rounded object(s). The computing device can utilize the detected rounded objects as input for performing one or more operations or processes on the computing device.

According to some embodiments, one or more images, including frames of real-time video, can be received from an image capturing device of the computing device. The computing device can operate one or more applications or operate in one or more modes that use the components of the image capturing device in order to receive visual input. The visual input can be of a scene and/or objects in the scene in which the lens of the image capturing device is focused on or pointed towards. For example, the scene can include an object of interest that is in motion and has a rounded shape.

Embodiments provide for the computing device to receive a plurality of images in order to detect one or more rounded objects (corresponding to one or more objects of interest) in one or more of the images. A rounded object that is depicted in an image, for example, can correspond to an object of interest having at least a housing or structure with a rounded shape or a partial rounded shape, such as an ellipse, oval, disc, sphere, etc. The object of interest can correspond to, for example, a ball, a circular object, a cylindrical object, or a self-propelled device having a spherical housing, etc., that is included within the scene (e.g., visual input detected by the image capturing device). In some examples, a self-propelled device can be modified (e.g., post assembly) to include a rounded or spherical aspect (e.g., attach a rounded object to the self-propelled device or drop a ping pong ball in a truck bed of a remote controlled truck). The computing device can process and utilize the detected objects in the images as input for performing one or more operations or processes on the computing device.

In some embodiments, each of the received images can be individually processed in order to detect one or more rounded objects. The computing device can use one or more detection techniques, together or individually, in order to detect the rounded object(s). According to one or more embodiments, the detection techniques can include using an image filter and a detection algorithm based on the size of the rounded object. In addition, the detection techniques can be used to determine the position information of one or more rounded objects based on a relative position of the one or more rounded objects in the one or more images. Detecting rounded object(s) in images can enable the computing device to track the movement of the rounded object(s), as well as the velocity and/or acceleration of the motion.

Upon detecting one or more rounded objects in the received images, the computing device can utilize the detected one or more rounded objects and the respective position information as input for performing additional operations or processes. In one embodiment, the computing device can adjust the images that include a detected rounded object, and present the adjusted images on a display device. In other embodiments, the computing device can use the detected rounded object as input for controlling the detected object (e.g., as a remote device).

According to one or more embodiments, the image capturing device can be distinct and separate from the computing device that detects the one or more rounded objects in the one or more images. The image capturing device and the computing device can wirelessly communicate with each other in order to enable the computing device to receive the one or more images from the image capturing device. A recording device, such as a video capturing device, can also be separate from and wirelessly communicate with the computing device. In other embodiments, the devices can be a part of or be incorporated together as one device.

Embodiments described herein also provide for the operations and/or processes that are performed by the recording device and/or the image capturing device and/or the computing device to be performed at different times and different orders (e.g., shifted temporally).

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules or components of a system. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as digital cameras, digital camcorders, desktop computers, cellular or smart phones, personal digital assistants (PDAs), laptop computers, printers, digital picture frames, and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates an example system for operating a computing device, under an embodiment. A system such as described with respect to FIG. 1 can be implemented on, for example, a mobile multi-functional computing device (e.g., smart phone, tablet device) having an integrated image capturing component. In variations, system 100 can be implemented on notebooks, laptops, or other computing devices that can be operated in an environment where a camera is controlled or operated to track a moving object.

In an example of FIG. 1, system 100 operates to process image input in order to dynamically detect a rounded object, such as an object in motion. The detected rounded object can be part of a housing of a device that is under motion and/or under control of a computing device. According to some examples described, the rounded object is detected as part of a programmatic process in which the device that is integrated with the rounded object is controlled in movement or operation. In variations, the rounded object is detected in motion as part of a programmatic process in which the presence of the object is used to generate other programmatic processes, such as augmented reality that utilizes the rounded object in motion as input. Accordingly, system 100 can detect rounded objects that correspond to objects of interest that are in motion. The detection of such objects can provide input to enable the computing device to perform other operations, such as to control the object of interest, or to integrate a representation of the object of interest into an augmented reality that is displayed on the computing device.

Still further, system 100 can perform dimensional analysis of a plurality of images depicting a scene that includes an object of interest. Specifically, system 100 can perform dimensional analysis in order to determine the distance of the object of interest from the image capturing device and/or the computing device. For that purpose, in one example, rounded objects can be detected and processed in images efficiently by components of system 100.

In one embodiment, system 100 includes object detect 110, image adjust 130, user interface (UI) component 140, device control 150 and wireless communication (WCOM) 160. The components of system 100 combine to receive a plurality of images from an image capturing device and to automatically process the images to detect one or more rounded objects depicted in the images. Each image can be processed using one or more detection techniques so that the detected objects can be processed as input for performing one or more operations on the computing device.

According to an embodiment, the object detect 110 can also include sub-components, such as image filter 112, gradient detect 120, and image mark 122. These components can combine to enable the object detect 110 to detect and track one or more objects depicted in a plurality of images.

The computing device can operate one or more applications and/or operate in one or more different modes. In one embodiment, system 100 can be operated in response to a user executing or launching an application or program that uses visual input detected by an image capturing device to perform one or more processes (e.g., a game application or a device calibration settings program). The object detect 110 can receive a visual input 114, such as image input, from the image capturing device in order to detect one or more rounded objects in one or more images. For example, an image capturing device (e.g., an integrated camera) can receive and capture a scene (e.g., from whatever view and/or object(s) the lens is pointing at). The visual input 114 can be in the form of a sequence of images, or through video input (e.g., a plurality of images that are captured continuously at 30-60 frames per second).

In some embodiments, a preview of the images that are being received by the computing device can be provided on a display device of the computing device. For example, the visual input 114 can also be provided to the UI component 140 so that the UI component 140 generates the preview image of the received visual input 114 (as well as one or more features that can be presented with the preview image, e.g., zoom in or zoom out features, capture image feature). The display device (e.g., a touch-sensitive display device) can present a dynamically changing, real-time image of a scene in which the image capturing device is currently pointing at. This image can include one or more objects of interest in the scene, having a rounded characteristic (e.g., having a rounded housing or portion of the housing). A user can also capture and store one or more images of the scene by pressing down on a capture button or trigger, or by using another user interface feature (e.g., tap a "capture image" graphic feature provided on a touch-sensitive display).

According to some embodiments, the object detect 110 can individually process individual images to detect objects of interest. In particular, the objects of interest can be designated to match a particular shape, such as semi-sphere, or sphere (or other spherical portion). For each received image via the visual input 114, the object detect 110 can operate an image recognition software, and/or other image processing methods in order to detect the rounded, designated characteristic of the object of interest. For example, the object detect 110 can scan the pixels of the individually captured images to detect rounded objects corresponding to spheres, semi-spheres or other variations (depending on the designated rounded characteristics).

The object detect 110 can use different detection techniques, together or individually, in order to detect one or more rounded objects in individual images. In one embodiment, the image filter 112 of the object detect 110 can receive one or more images and apply a filter, such as a grayscale filter, to each of the received images. Applying a grayscale filter to the image can convert each pixel of the image to a shade of gray (e.g., based on intensity information). The image filter 112 can provide a grayscale image 116 of each received image to the gradient detect 120 and the image mark 122. Once in grayscale, a trained object detector can scan the grayscale pixels for rounded objects that potentially correspond to the object of interest. The use of the grayscale filter promotes fast image object detection to enable real-time detection of an object of interest when that object is in motion.

In some embodiments, the objects of interest can include additional characteristics to facilitate their respective tracking. For example, the rounded characteristic of the object of interest can further be combined with additional features, such as other structural visual landmarks, brightness in color (e.g., white, silver, yellow, etc.), illuminations, or surface patterns. By way of example, the object of interest can be brightly colored (e.g., white), and the use of a grayscale filter on the processed input images can yield objects which can have a lighter shade of gray than other pixels for other portions of the same scene. In one embodiment, the grayscale images 116 can be provided to the gradient detect 120 and the image mark 122, which use one or more image processing methods (e.g., apply one or more algorithms), to detect the rounded object(s) in each grayscale image 116.

Still further, in variations, known (or pre-determined) information about the objects of interest can be used in performing object detection. For example, a user can provide inputs 126 that correspond to visual markers for the object of interest. Such inputs 126 can include, for example, the estimated size (e.g., a radius or diameter) of the rounded object(s) as well as the color(s) of the object(s) via an input mechanism (e.g., using one or more buttons, or a touch-sensitive display screen). In another variation, the user can provide input 126 corresponding to a circular gesture on the touch-sensitive display in order to indicate an approximate size of the object as presented on the display. In other examples, information about the one or more rounded objects can be stored in a memory of the computing device. The gradient detect 120 can use known information in order to detect the rounded object(s) in each of the images.

In one embodiment, the gradient detect 120 can process individual pixels (or some pixels) of the grayscale images 116 in order to determine a respective gradient for the individual pixels. The gradient for particular pixel can be based on surrounding pixels, including immediately adjacent pixels. A gradient corresponds to a vector having a direction in which the brightness level of pixels in that direction increases. For example, the brightness level of a pixel is lower or less bright than the brightness level of other pixels in the direction of the gradient. The image mark 122 implements logic that marks, for the determined gradient of each pixel, a point in the direction of the gradient that is within the distance equal to a radii (e.g., actual radius, radius of curvature) of the rounded object(s). For example, the user can indicate (via a user input 126) that the rounded object to be detected has a radius of a certain size or approximate pixel length. For example, the approximated pixel length can be set to twenty pixels. In other examples, the approximated pixel length can be assumed or predetermined based on previously stored information about the size of the rounded object in the image. Using the determined gradient, for each pixel, the image mark 122 can mark a point within the twenty pixel length of that particular pixel in the direction of the gradient that has the highest brightness level. This can represent a center or middle of the rounded object. Based on the plurality of markings (e.g., a marking for each pixel of the grayscale image 116), the object detect 110 can assume that a region of the image having a plurality of markings corresponds to the center of the rounded object and can determine the location or position of the rounded object(s) in each grayscale image 116 (if any exists). The determined position information of the rounded object can be relative to the image.

The gradient detect 120 can also access parameters (that can be stored in a database or list in a memory resource of the computing device) in determining the gradient for each pixel in the grayscale image 116. A parameter, for example, can include a brightness threshold and a gradient threshold. The brightness threshold can instruct the gradient detect 120 to ignore computing a gradient for a particular pixel if adjacent pixels (pixels in a direction moving away from the particular pixel within a radius distance of that particular pixel), do not show a pattern of increasing in brightness. In another example, a gradient threshold can instruct the gradient detect 120 to ignore computing a gradient for a particular pixel if adjacent pixels do not show a strong enough change in brightness levels in a direction moving away from the particular pixel. For pixels where gradients are not computed, no markings would be provided by the image mark 122.

In another embodiment, the object detect 110 can apply different radii of a rounded object in order to detect the rounded object in the grayscale images 116. Because the gradient detect 120 and the image mark 122 can process each individual pixel in a grayscale image 116, the object detect 110 assumes that the radii used to detect the rounded object can vary from one region of the image to another, for each grayscale image 116. Due to the angle, the orientation, the distance, and the positioning of the image capturing device in relation to the rounded object(s), a rounded object(s) can vary in size depending on how close it is to the user. The object detect 110 can receive information about the orientation and the positioning of the image capturing device (e.g., where the lens of the image capturing device is pointed at or focused on) to determine whether a given pixel in an image represents the ground or floor that is closer to the user or user's feet, or whether the pixel represents a point that is further away from the user (e.g., closer to the horizon). The object detect 110 further assumes that if a particular point in the image represents a region that is closer to the user, then the rounded object at or near that point would typically be larger in the image than if the rounded object was further away from the user. As a result, for a point that represents a region closer to the user, the image mark 122 can apply a larger radius when marking a region in the direction of the gradient of that point (as the rounded ball to be detected is assumed to be larger in the image).

For a point that represents a region that is further away from the user, the rounded object at or near that point would typically appear to be smaller in the image. As a result, after determining that the given point represents a region further away from the user, the image mark 122 can apply a smaller radius when marking a region in the direction of the gradient for that point (e.g., ten pixel lengths instead of twenty pixel lengths). In this manner, the object detect 110 can also determine whether the rounded object is moving in one or more directions, as the rounded object can become larger in size from one image to another in a sequence of images (e.g., if it is moving closer to the user) or become smaller in size from one image to another (e.g., if it is moving further away from the user).

For example, based on the accelerometer and/or other sensing mechanisms of the computing device, the computing device can detect its position relative to the ground. In addition, the computing device can determine the ground plane and horizon of the image(s) being provided by the image capturing device. Based on the determined information, if the user is holding the computing device in a way so that the lens of the image capturing device is pointing to an area that is closer to her, for example, the computing device can increase the radius (e.g., size) of rounded objects that are being detected. On the other hand, if the user is holding the computing in a way so that the lens of the image capturing device is pointing to an area that is further away from the user (e.g., a further distance away proximity), the radius of rounded objects that are being detected can be decreased.

As discussed, for each determined gradient (for each pixel), the image mark 122 can mark a point (e.g., a location in or with the image) in the direction of the gradient that is within the distance equal to the radius of the rounded object(s). In this manner, instead of the user indicating that the rounded object to be detected has a certain radius, the image mark 122 can mark a point within a varying radius in the direction of the gradient that has the highest brightness level. The radius can be varied depending on whether the lens of the image capturing device of the computing device is pointing to an area that is closer to or further from the user.

In some embodiments, the estimated size of the one or more rounded objects can be automatically configured and/or stored in a memory resource of the computing device. For example, a rounded object can be a self-propelled device having a rounded housing (e.g., a spherical housing) that is paired or wirelessly connected with the user's computing device. Information about the user's self-propelled device can be stored in the memory resource of the computing device.

The object detect 110 can also apply different types of filters depending on the user input 126. In some embodiments, the image filter 112 can apply other types of filters depending on the color(s) of the rounded object(s) of interest that is being detected by the object detect 110. If the rounded object of interest is dark in color, for example, the user can provide an input 126 that indicates the color of the ball.

The object detect 110 can detect one or more rounded objects in one or more images and also provide information corresponding to the detected objects. Information about the detected objects can include the color of the object, the size, the shape (e.g., ellipse or sphere), the position of the object relative to the image, etc. In one embodiment, the information about the detected rounded object(s) can be stored in a memory resource of the computing device.

According to one or more embodiments, system 100 utilizes the detected one or more objects from the image(s) (including the position information of the one or more objects) as input for performing one or more operations or processes on the computing device. In the example system of FIG. 1, the object detect 110 can provide information about the detected object and the images (e.g., object detected images 124) to the image adjust 130 and the device control 150. For example, the image adjust 130 can operate as part of or in conjunction with a gaming application.

In some embodiments, system 100 can determine that a rounded object of interest is moving based on the object detected images 124. For example, two or more images corresponding to different instances in time (e.g., in sequence) can include a rounded object corresponding to the object of interest in the scene. In the first image of two or more images, the rounded object can be detected at a first position relative to that image. In the next image in the sequence, the rounded object can be detected at a second position relative to that image. As a result of the change in position of the detected rounded object in different images, the device control 150 and/or the image adjust 130 can determine that the rounded object is in motion (or has moved). In other examples, the rounded object of interest can be in a stationary position, but be rotating in place. The rotating rounded object can be detected in the image(s).

Still further, the rounded object detected from image input can be translated into a coordinate data for a given reference frame relevant to the image depiction. This coordinate reference frame can be translated into a real-world coordinate system in order to observe and/or predict position related information about the object of interest. The position of the object of interest can thus be mapped from an image depiction of the object, given that the depth of the object from the image capturing device can be determined from dimensional analysis of the object's depiction. In addition to position information, the velocity of the object of interest can be determined from the reference frame of the image depiction of the object, as mapped to the determined reference frame of the real-world object of interest.

In another example, the object of interest having a rounded characteristic can be placed on top of an object with a known height instead of on the ground or floor (e.g., on top of a coffee table or on top of a remote controlled toy truck). Using the known (or pre-determined) information about the object of interest and the known height, the object detect 110 can determine a more accurate position of the object in the image(s). In addition, based on the information (such as the known information and height) and the reference frames, the image adjust 130 can provide images that are to be rendered on a display device that are dimensionally accurate (with respect to the actual location of the object of interest and the position of the image capturing device).

For example, the image adjust 130 can process the object detected images 124 in order to dynamically adjust at least a portion of an image. The image adjust 130 can also access a set of rules for mapping the coordinate reference frame and the real-world coordinate system so that the rendered adjusted images can be dimensionally accurate with respect to the real-world scene. The rules can correspond to real world parameters. In some example, the real world parameters can be altered, e.g., by user input, if a dimensionally accurate rendition is not desired.

The image adjust 130 can also store the adjusted image 132 in a memory resource of the computing device. This enables a user to access the memory resource in order to view any of the stored adjusted images 132 at a later time. In other embodiments, system 100 can enable additional processing of the images for performing other operations. The image adjust 130, for example, can access the previously processed images and perform additional adjustments to the images. In some variations, the processes performed by the object detect 110 and/or image adjust 130 can be performed on images that are stored, rather than "live" or in real-time. Thus, for example, the processes described with the object detect 110 and the image adjust 130 can optionally be temporally shifted with respect to when the images are captured and/or stored.

In other examples, the image adjust 130 can dynamically overlay or replace the detected rounded object in the image with a graphic image (e.g., a character, an animal, some other object other than a ball) or after the image of the detected rounded object itself (e.g., change the color of the rounded object, or distort the rounded object) in real-time. The adjusted image 132 can be provided to the UI component 140 so that the user of the computing device can see on a display device, rendered content that includes the adjusted detected object. The UI component 140 can also generate one or more features that can be presented on the display device of the computing device. As described, in some examples, the adjusted content that is rendered can be dimensionally accurate with respect to the position of the actually object of interest and the position of the image capturing device.

For example, the user can watch a live sporting event (e.g., kids playing soccer at a park) and point the lens of her computing device at the field. The visual input 114 received can include a plurality of frames of images detected by the image capturing device. The object detect 110 can detect the rounded object (corresponding to the object of interest, e.g., the soccer ball) in each of the sequence of images (e.g., the position of the ball can be different in each image because the ball is in motion). The image adjust 130 can process the detected object (e.g., the detected soccer ball) by highlighting the ball or providing a ring around the ball and providing the images to the UI component 140. The user is then able to see the adjusted images 132 (with any additional features) on the display device of the computing device.

In other embodiments, the device control 150 can process the object detected images 124 in order to provide one or more controls for a remote device. For example, the detected rounded object can be a self-propelled device that is paired or wirelessly connected with the user's computing device. The user can see the representations of the received visual input 114 that includes the detected rounded object (e.g., the user's self-propelled device) on the display device of the computing device. The user can then interact with the displayed representation of the self-propelled device on the touch-sensitive display screen by providing user input 152 (e.g., touch input on the touch-sensitive display screen) to the device control 150.

The device control 150 receives object detected images 124 and the user input 152 to determine what types of control information to generate 154. Based on the received information corresponding to the detected rounded object via object detected images 124, the control information 154 can be determined by detecting the user input 152 on a particular location of the display screen, for example, and determining that the location corresponds to the detected rounded object on the image. For example, the user can tap on the displayed representation of the self-propelled device to cause it to spin, for example, or tap and drag his or her finger in a direction to cause the self-propelled device to move accordingly. The control information 154 is provided on the WCOM 160 so that the information can be provided to a remote device.

For example, the device control 150 determines the position of the detected rounded object in the object detected image(s) 124 (e.g., the position of the detected rounded object relative to the image). When the user provides an input or performs a gesture on the representation of the self-propelled device (e.g., drags the representation to the right on the touch-sensitive display), the device control 150 can determine the path of the gesture, relative to a reference (e.g., the original position of the displayed representation of the self-propelled device), and translate the gesture to control signals for moving the self-propelled device in a similar manner. The control signals can be provided to the self-propelled device to cause the self-propelled device to move accordingly.

The WCOM 160 serves to exchange data between system 100 and other external devices (e.g., such as a remote device or the user's self-propelled device). In one embodiment, WCOM 160 can implement a variety of different protocols, such as a BLUETOOTH communications protocol, a Wi-Fi communications protocol, infrared communications protocol, etc. The control information 154 can be wireless communicated to the remote device (e.g., the self-propelled device, for example) to cause the self-propelled device to perform a designated action corresponding to the user command.

In some embodiments, the device control 150 can provide control information 154 for calibrating one or more components of the remote device (or for calibrating one or more components of the computing device). For example, the rounded object of interest (e.g., the user's self-propelled device) can have one or more gyroscopes. Over time, the gyroscope may need recalibration due to gyroscope drift. By using the object detected images 124, the device control 150 can detect whether the self-propelled device is moving, for example, or whether it is stationary, and provide control information 154 (that includes calibration information) to be transmitted to the self-propelled device via WCOM 160. Based on detecting the line of movement of the self-propelled device and the object detected images 124, the device control 150 can calibrate the gyroscope of the self-propelled device. In one embodiment, the device control 150 can also receive device information 162 from the self-propelled device that includes current information about the components of the self-propelled device (including real-time information about the gyroscope). The device control 150 can use this information for calibrating the gyroscope of the self-propelled device. In this manner, system 100 can be used to eliminate gyroscope drift.

Similarly, the one or more gyroscopes of the computing device can also be calibrated using the detected rounded object. For example, when the rounded object is determined to be still or stationary, the device control 150 can calibrate the gyroscope of the computing device by using the detected rounded object as a reference point.

The object detect 110 can also provide object detected images 118 to other components or systems of the computing device and/or to remote devices (not shown in FIG. 1) for additional processing. Other components can process the detected rounded objects as inputs for performing other operations.

According to one or more embodiments, the visual input 114 received by system 100 can also be provided from an image capturing device that is remote from the computing device. For example, the image capturing device can be separate from the computing device. The image capturing device can detect and/or capture scenes and transmit the visual input 114 to the computing device (e.g., using a wire or wirelessly). System 100 can receive the visual input 114 via the WCOM 160, for example, when the visual input 114 is received wirelessly from the image capturing device. System 100 can then detect one or more rounded objects from the images received from the remote image capturing device and perform additional operations based on the processed detected objects.

In another embodiment, system 100 can receive the images (e.g., frames from real-time video) and then process the images (e.g., detect one or more rounded objects and/or adjust the images) after a duration of time. For example, the visual input 114 provided by the image capturing device can first be stored in a memory resource of the computing device before the object detect 110 retrieves or receives the visual input 114 for processing. The object detect 110 can perform the processing in response to a user input 126 (thereby causing the visual input 114 to be retrieved or received by the object detect 110 from the memory resource). In other embodiments, system 100 can perform additional processing even after the images are dynamically processed. For example, after the image adjust 130 processes the object detected images 124 the first time, at a later time, the image adjust 130 can perform additional processing to provide different adjusted images 132 to the UI component 140. In this manner, a user can view different adjusted images 132 (e.g., an adjusted image with different graphic image overlays) at different times.

In some embodiments, some of the components that are described in system 100 can be provided as being individual components or as being part of the same component. For example, the object detect 110 and the image adjust 130 can be provided as part of the same component. In another example, the object detect 110 and the device control 150 can be provided as part of the same component. In other embodiments, the components that are described in system 100 can be provided as part of the device operating system or as part of one of more applications (e.g., as part of a camera application, a remote device controlling application, or a gaming application). Logic can be implemented with a camera application (e.g., software) and/or with hardware of the image capturing device.

In some examples, the object of interest can alternatively have other predefined shapes that can be subject to dimensional and image analysis in order to detect objects in one or more images. For example, system 100 can utilize other object detection and/or image processing techniques to detect objects having shapes other than a rounded shape, such as a classifier that is trained for detecting an object with a particular two-dimensional shape (e.g., having a rectangular shape or triangular shape). The object detect 110 can detect other predefined shapes to translate dimensional information about an image of that object into spatial and/or positional information in the real-world.

As an addition or alternative, examples described herein can also be used for adjacent object analysis. In adjacent object analysis, position information about an object that is adjacent to the object of interest can be determined based on its known spatial relationship with the object of interest. For example, the object of interest can be a tank vehicle, where the position of the tank vehicle can be determined in the image(s). The gun that the tank vehicle is equipped with can also be tracked using adjacent object analysis.

Still further, multiple objects of interest (e.g., having a rounded or spherical shape) can be simultaneously tracked in one or more images of a given scene. The objects of interest can be in motion or be stationary. The object detect 110 can detect multiple objects of interest along with the position information for each tracked object. The position of each tracked object relative to other tracked objects can be used to determine other objects or points of interest that may be intermediate to the objects of interest. For example, multiple spherical objects can be detected and tracked in images to determine a point cloud for purpose of determining the position of other objects that may be near one or more of the tracked objects.

Methodology

Figure 2:
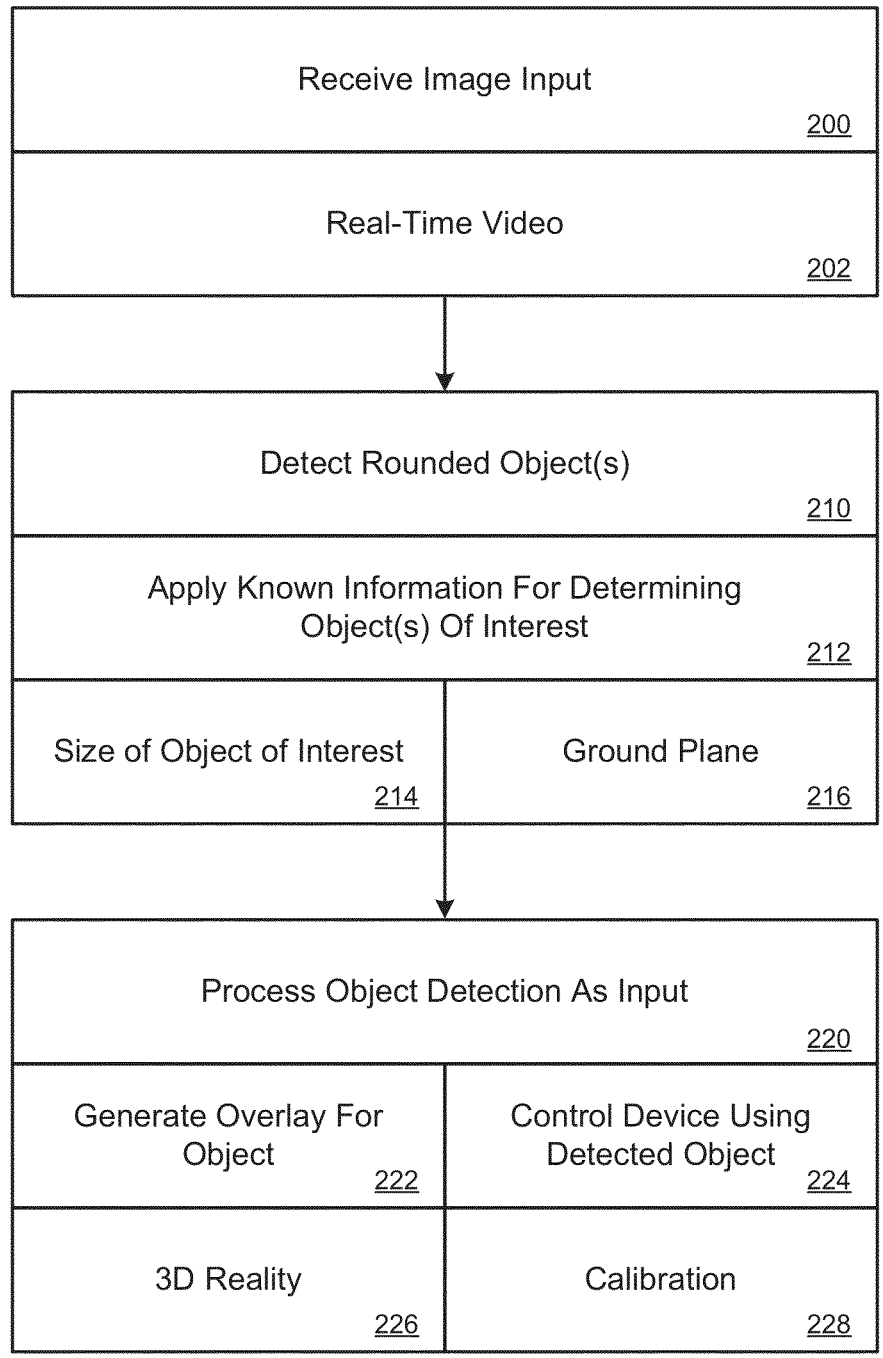
FIG. 2 illustrates an example method for operating a computing device, according to an embodiment.

FIG. 2 illustrates an example method for operating a computing device, according to an embodiment. A method such as described by an embodiment of FIG. 2 can be implemented using, for example, components described with an embodiment of FIG. 1. Accordingly, references made to elements of FIG. 1 are for purposes of illustrating a suitable element or component for performing a step or sub-step being described.

The computing device can receive a plurality of images from its image capturing device (step 200). The plurality of images can correspond to visual input of a scene that the lens of the image capturing device is pointing at or focused on. In some embodiments, the image input can correspond to real-time video that is provided by the image capturing device (sub-step 202). Real-time video can include a number of frames (where each frame can be an image) that are detected and/or captured per second (e.g., 30 frames per second).

Each of the images can be individually processed to detect one or more rounded objects in the images (step 210). The computing device can operate an image recognition software and/or other image processing methods in order to detect the rounded object(s) in each image. A rounded object in an image can correspond to an object of interest that is present in the scene and having a rounded housing characteristic. In one embodiment, the rounded object(s) can be detected by applying known information for determining object(s) of interest (sub-step 212). The known information can be provided by a user or can be preconfigured and/or stored in a memory resource of the computing device.

According to one or more embodiments, the known information can include the size of the rounded object(s) of interest (sub-step 214). The size of the rounded object(s) can correspond to the radius (or radii for ellipses, for example) of the object or the diameter of the object, or in some cases, the relative size as compared to the screen size of the display device. The one or more rounded objects can be detected in each of the images by using size information about the rounded object(s), such as a radius or diameter of a rounded object (e.g., in pixel lengths). In addition, known information can include information corresponding to the positioning of the computing device with respect to the ground plane (sub-step 216). Based on the orientation, direction, and position in which the user is pointing the lens of the computing device, the rounded object(s) can be determined as being smaller in size (relative to the screen size) or larger in size. In such cases, the radius or diameter of the rounded object can dynamically vary in size. A rounded object can be detected in each image, for example, by applying a grayscale filter, such as discussed in FIG. 1. In addition, information of the rounded object, such as the position information of the rounded object relative to the image, can also be determined.

By detecting one or more rounded objects in the images, the computing device can utilize the detected object(s) and the position information of the detected object(s) as input for performing one or more operations or processes on the computing device (step 220). For example, the computing device can adjust the images, for display on a display device, by generating an overlay or by replacing the detected rounded object(s) in the image with a graphic feature that mimics the movement of the rounded object(s) in the images (sub-step 222). Such graphical adjustments can be useful for gaming applications that use real world scenarios as part of the game.

In one embodiment, the overlay can also be a graphic feature having three-dimensional characteristics. The graphic feature can be rendered as part of the displayed images so that it is consistent with the three-dimensionality and movement of the detected rounded object. For example, if the rounded object rotates in 180 degrees, the overlaid graphic feature can also rotate in a similar feature.

The computing device can also process the detected object(s) as input for wirelessly controlling the detected rounded object(s) (e.g., the self-propelled device) (sub-step 224). For example, the user can manipulate the image containing the representation of the self-propelled device on the display device in order to control the actual self-propelled device (e.g., the object of interest) to move in a certain direction with a certain speed. The user can also tap a target location on the touch-sensitive display screen in order to cause the self-propelled device to move to the target location. In another embodiment, the detected rounded object(s) can be used as input for projecting or displaying images based on real life objects in the vicinity of the user and the real life rounded object (sub-step 226). The detected rounded object(s) can also be used for calibrating one or more components of the detected rounded object (sub-step 228).

Other applications of processing the detected object(s) as input may include tracking balls in ball sports, or using balls and/or circular discs as being markers or fixed reference points (e.g., fiducial markers). The discs, for example, can be used as a reference point or measurement point for placing other objects in the image(s). In addition, other applications include using the detected object(s) for spatial mapping or navigation. Points, object positions, navigation way-points, etc. can all be given virtual locations which correspond with concrete locations over a long period of time. The computing device can provide information about the location and position of the detected rounded object to the rounded object so that the rounded object (e.g., self-propelled device) can measure its own progress toward target locations and navigate itself to locations. In other applications, based on the detected rounded object(s), absolute positions of objects of known height can be calculated by selecting (e.g., tapping on the display screen) the objects' locations from the image(s).

Figure 3A:
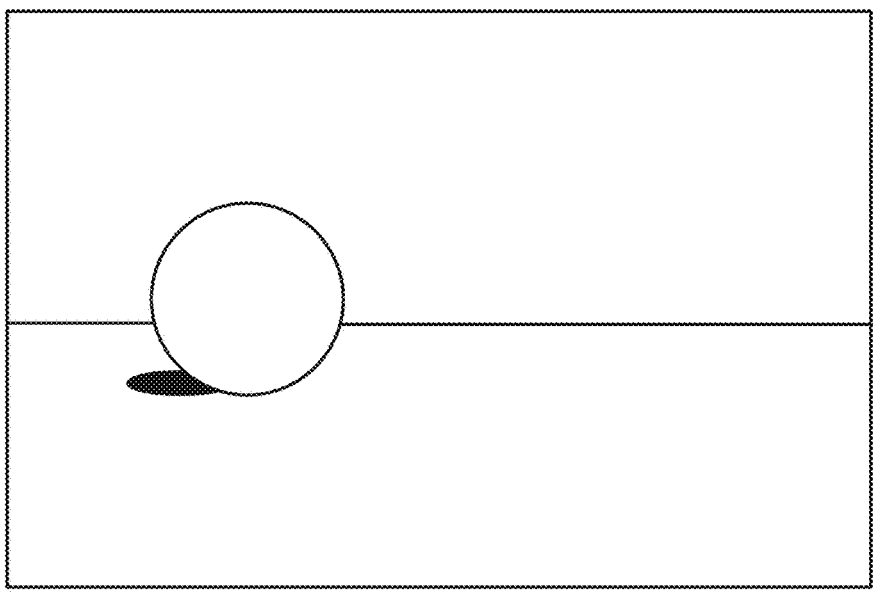
FIGS. 3A-3B illustrate an example of a processed image, under an embodiment.
Figure 3B:
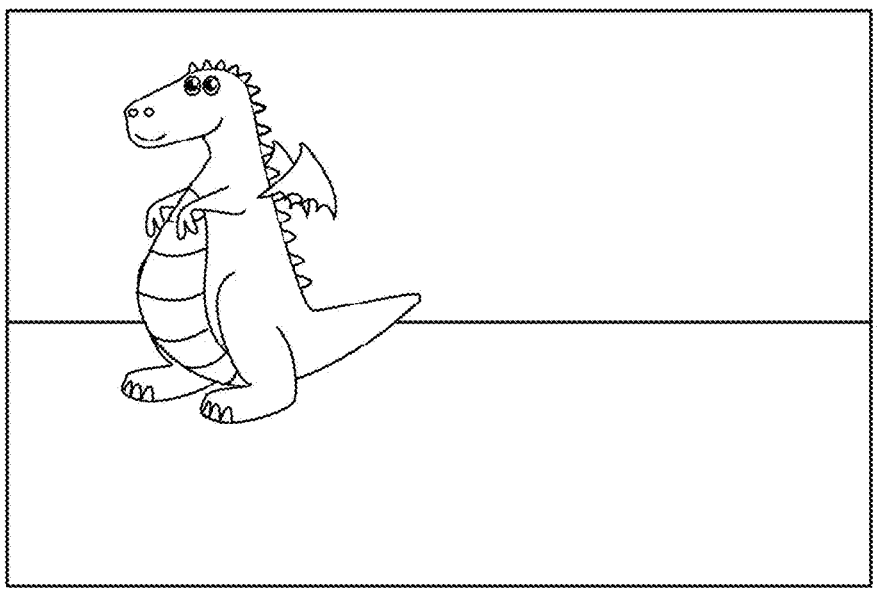

FIGS. 3A-3B illustrate an example of a processed image, under an embodiment. The example user interface features provided on a display device, such as described by an embodiment of FIGS. 3A-3B, can be implemented using, for example, components described with an embodiment of FIG. 1. Accordingly, references made to elements of FIG. 1 are for purposes of illustrating a suitable element or component for performing a step or sub-step being described.

FIG. 3A illustrates an image of a scene that includes a representation of a rounded or spherical object (e.g., a ball). The rounded object can be in motion. However, because FIG. 3A illustrates a single image of a sequences of images, for example, the rounded object is depicted as being stationary. The computing device can provide such an image on a display device as part of a preview of what is being detected and/or captured by the image capturing device of the computing device.

After the computing device detects the rounded object and the location or position of the rounded object in the plurality of images, the detected rounded object can be utilized as input for performing one or more additional operations. In one embodiment, the image(s) can be adjusted by visually altering the detected rounded object. For example, the user can operate the computing device in order to play a game (e.g., operate a gaming application). In FIG. 3B, the image including the detected rounded object can be adjusted by overlaying or replacing the detected rounded object with another graphic image (e.g., a dragon) as part of the game. As the spherical object moves in real time and in the real world, the sequence of images being received also depicts the ball as moving.

Each of the images can be processed to detect the spherical object, and the detected spherical object can be processed as input so that, on the display device of the computing device, the displayed dragon also moves accordingly. In some variations, the images being rendered can be dynamically adjusted. For example, the graphic image of the dragon can be dynamically changed to a graphic image of a lizard in response to a trigger, such as a user input or the object of interest being moved to a particular location or next to another object of interest.

As an addition or alternative, a computing device, such as a device that implements system 100 of FIG. 1, can detect multiple rounded objects in images and track the positions and/or movements of the multiple rounded objects, while another computing device controls the object of interests. In some embodiments, an image capturing device and/or the computing device that processes the images to detect one or more rounded objects can be separate and distinct from a computing device that controls the movement of the object of interest, such as a rounded or spherical self-propelled device. Still further, in one variation, content (e.g., a graphic overlay) that is rendered based on the detected and tracked object on a computing device can be dynamically altered based on one or more triggers or inputs provided by another computing device.

For example, multiple users can engage with one another in a gaming environment, where a first user controls the movement of the object of interest using a first computing device, while a second user and a third user track the object of interest and render content on their respective computing devices. A fourth user can use a fourth computing device to control what content is being displayed on the second and third users' devices (e.g., dynamically adjust what graphic image is displayed in place of the detected object). For example, in one implementation, the second user can track the object of interest and view rendered content that is different than content that is rendered on a computing device of the third user (e.g., based on the fourth user controlling what content is to be displayed to individual users). The computing devices can communicate with each other via a wireless communication protocol, such as Bluetooth or Wi-Fi.

In another usage example, multiple users with respective computing devices can detect and track ten objects of interest, including one or more self-propelled devices. Control over one or more objects of interest can be passed between the users.

Hardware Diagram

Figure 4:
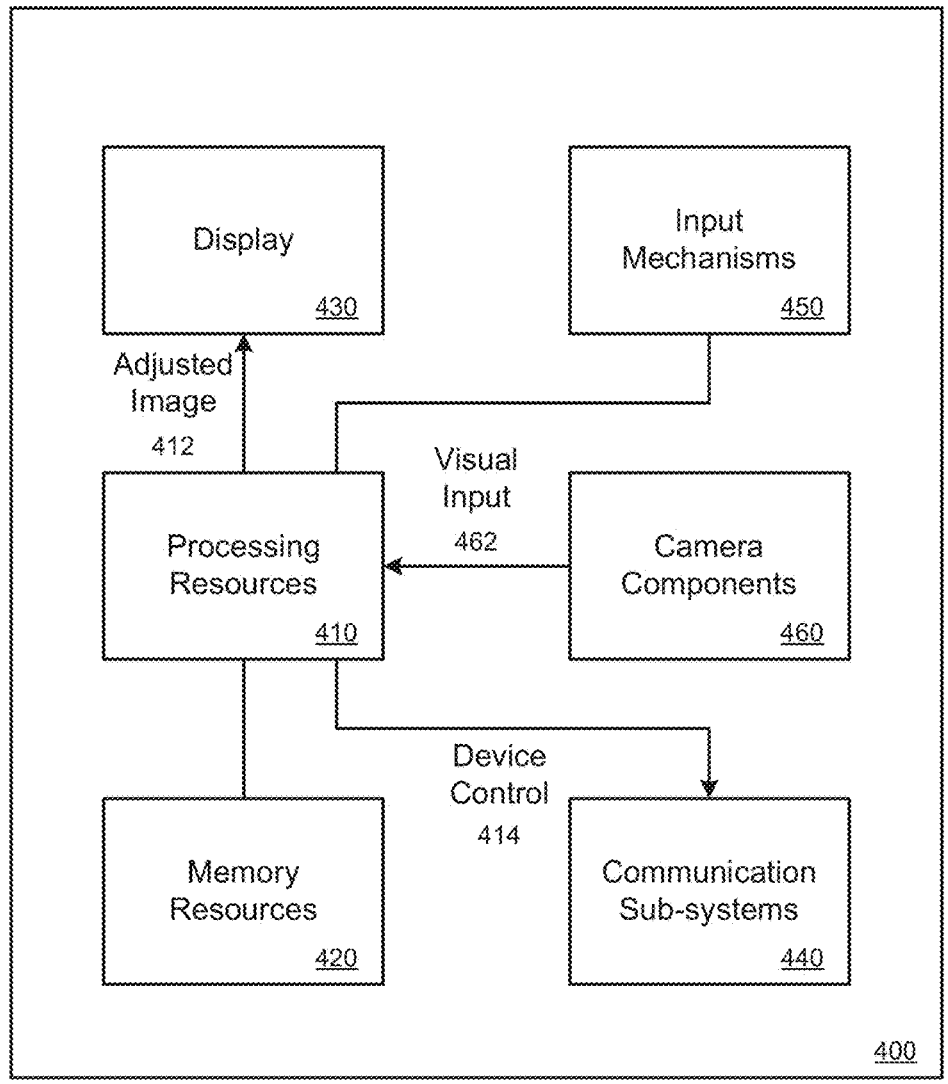
FIG. 4 illustrates an example hardware diagram for a system for operating a computing device, under an embodiment.

FIG. 4 illustrates an example hardware diagram of a computer system upon which embodiments described herein may be implemented. For example, in the context of FIG. 1, the system 100 may be implemented using a computer system such as described by FIG. 4. In one embodiment, a computing device 400 may correspond to a mobile computing device, such as a cellular device that is capable of telephony, messaging, and data services. Examples of such devices include smart phones, handsets or tablet devices for cellular carriers, digital cameras, or laptops and desktops (e.g., PC). Computing device 400 includes processing resources (e.g., one or more processors) 410, memory resources 420, a display device 430, one or more communication sub-systems 440 (including wireless communication sub-systems), input mechanisms 450, and camera components 460. The display device 430 can be a touch-sensitive display device that can also receive input from a user. In one embodiment, at least one of the communication sub-systems 440 sends and receives cellular data over data channels and voice channels.

The processing resources 410 are configured with software and/or other logic to perform one or more processes, steps and other functions described with embodiments, such as described by FIGS. 1-3, and elsewhere in the application. The processing resources 410 are configured, with instructions and data stored in the memory resources 420, to implement the system 100 (as described with FIG. 1). For example, instructions for implementing the object detect (including the image filter, the gradient detect, the image mark), the image adjust, the UI component, and the device control can be stored in the memory resources 420 of the computing device 400.

The processing resources 410 can execute instructions for operating the object detect and for receiving images (via visual input 462) that have been captured by the lens and/or other components 460 of the image capturing device. After detecting one or more rounded objects in the one or more images, the processing resources 410 can execute instructions for causing adjusted images 412 to be presented on the display device 430. The processing resources 410 can also execute instructions to provide device controls 414 for a remote device via the communication sub-systems 440.

In some embodiments, the processing resources 410 can execute and operate a variety of different applications and/or functionalities, such as, for example, a home page or start screen, an application launcher page, messaging applications (e.g., SMS messaging application, e-mail application, IM application), a phone application, game applications, calendar application, document application, web browser application, clock application, camera application, media viewing application (e.g., for videos, images, audio), social media applications, financial applications, and device settings.

Interactive Augmented Reality

Figure 5:
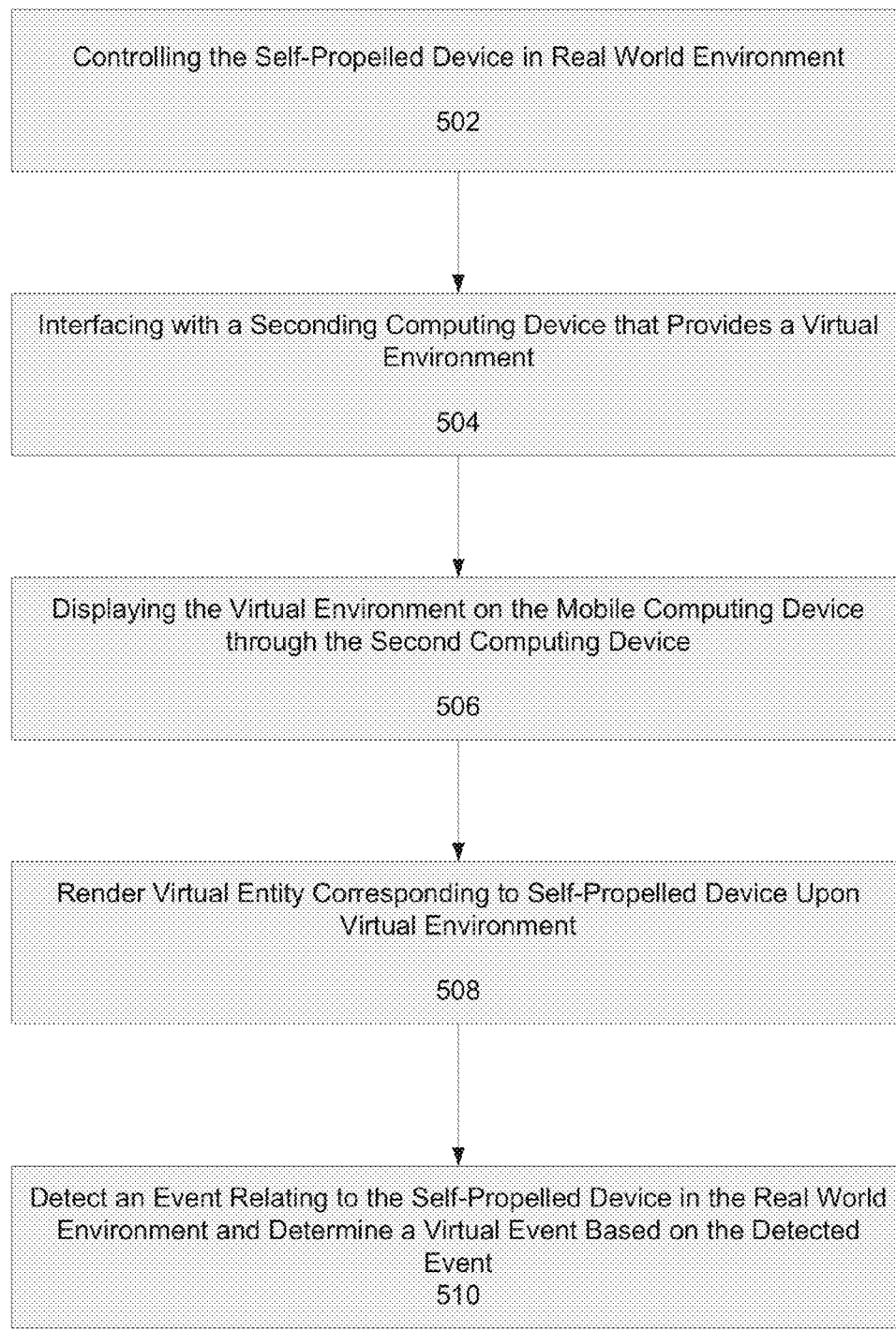
FIG. 5 illustrates and example method of controlling a self-propelled device as an augmented reality entity using a mobile computing device linked to a second computing device.

FIG. 5 illustrates and example method of operating a self-propelled device as an augmented reality entity using a mobile computing device linked to a second computing device. In one or more embodiments, a method for operating a self-propelled device can include controlling the movement self-propelled device in a real-world environment (502). Controlling the self-propelled device may be performed by a mobile computing device. The mobile computing device may include programmatic functions that enable a user to control the movement of the self-propelled device using rendered or displayed controls on a display of the mobile computing device.

In many embodiments, the method further includes interfacing with a second computing device that provides a virtual environment in order to cause the second computing device to render a virtual entity upon the virtual environment (504). The virtual entity may correspond to the self-propelled device moving in the real-world environment. In many embodiments, the interfacing may be performed by the mobile computing device. For example, a user of the mobile computing device may launch an application that causes the mobile computing device to interface with the second computing device. Alternatively or as an addition, the second computing device may perform the function of interfacing with the mobile computing device. For example, a user of the second computing device may provide an input that causes the second computing device to interface with the mobile computing device. The second computing device may include a controller, whereby the user may operate the controller to interact with the virtual environment. Using the controller, the user may then prompt the second computing device to interface with the mobile computing device.

In many embodiments, once the mobile computing device and the second computing device have interfaced, some or all of the virtual environment may then be displayed on the mobile computing device via the second computing device (506). A virtual entity corresponding to the self-propelled device can also also be rendered in the virtual environment (508). For example, a character in the virtual environment may represent the self-propelled device in the real-world environment. In these and related embodiments, a user of the mobile computing device may simultaneously control the self-propelled in the real-world environment and the virtual entity in the virtual environment. In related embodiments, the virtual environment may be provided as augmented reality, and the virtual entity corresponding to the self-propelled device may interact in the augmented reality.

In many embodiments, the method further includes detecting an event relating to the self-propelled device in the real-world environment, then generating a virtual event based on the detected event (510). For example, the detected event may relate to a particular movement or interaction of the self-propelled device in the real-world environment. The event may be detected by either the mobile computing device or the second computing device via the interface. The mobile computing device may then incorporate the virtual event into the virtual environment. In doing so, the mobile computing device may translate that particular movement or interaction as a virtual event, such as a control or command in the virtual environment. As an addition or alternative, the real-world event may relate to the self-propelled device impacting a surface. Such an impact may correspond to a virtual event in which the virtual entity performs a function. The function may be configured by the user, or may be preprogrammed in a game or application.

Figure 6A:
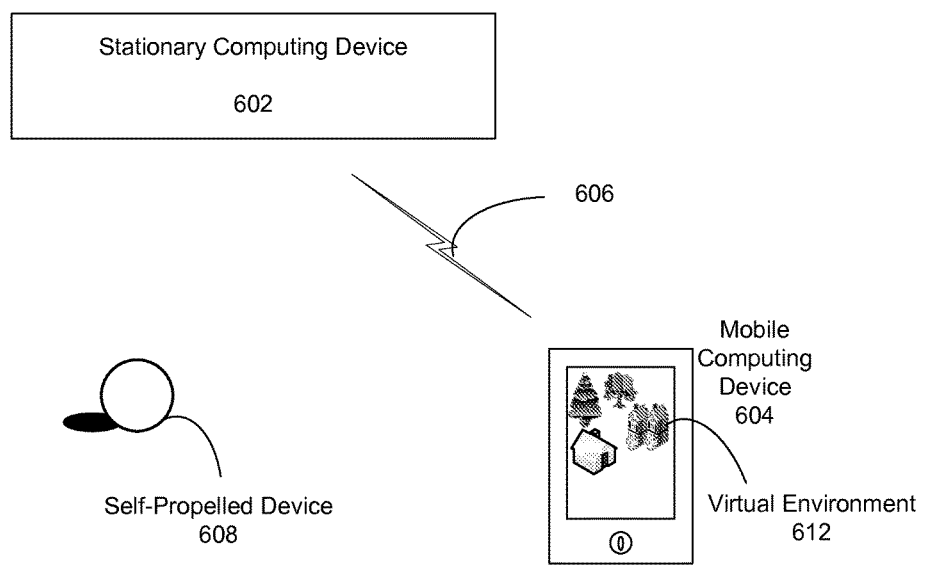
FIGS. 6A-6B illustrate an example of controlling a self-propelled device as an augmented reality entity using a mobile computing device linked to a second computing device.
Figure 6B:
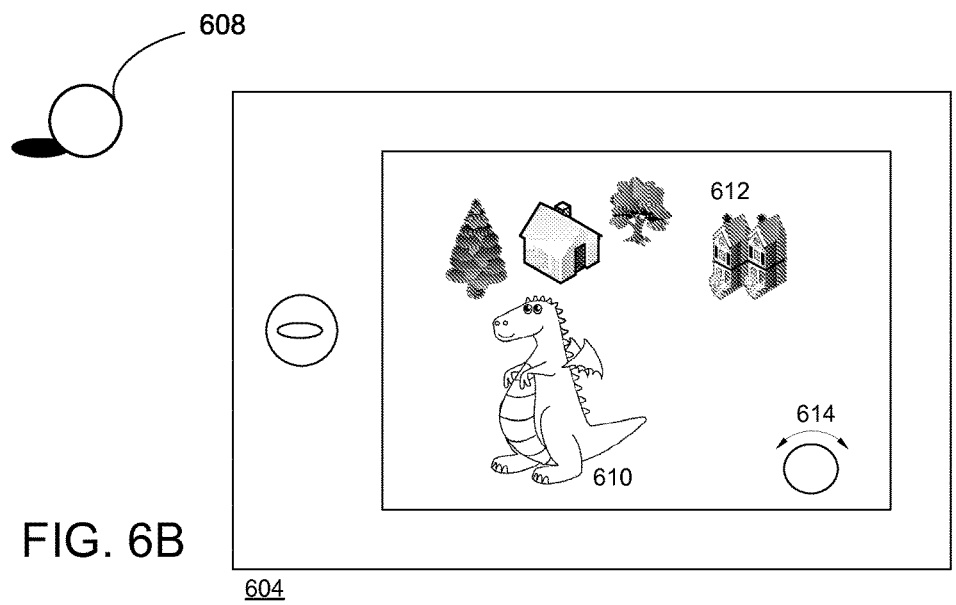

FIGS. 6A-6B illustrate examples of controlling a self-propelled device 608 as a virtual entity 610 in a virtual environment 612 using a mobile computing device 604 linked to a second computing device 602. An example system, such as shown in FIG. 6A, can include a mobile computing device 604 in communication with a second computing device 602. The mobile computing device 604 may be further operable on a self-propelled device 608. The communication link 606 between the mobile computing device 604 and the second computing device 602 may allow for displaying a virtual environment 612 on the mobile computing device 604 through the second computing device 602. Additionally, the mobile computing device 604 may then render the self-propelled device 608 as a virtual entity 610 within the virtual environment 612.

Referring to FIG. 6A, the second computing device 602 may provide a virtual environment 612 to the mobile computing device 604 over a communication link 606. The communication link 606 may be created by the mobile computing 604 device interfacing with the second computing device 602. The second computing device 602 may be any computing device operable to provide such an environment 612. For example, the second computing device may be a desktop computer or a laptop computer. Alternatively, the second computer may be a gaming console, such as those in the XBOX family of consoles developed by MICROSOFT, or those in the PLAYSTATION family of consoles developed by SONY COMPUTER ENTERTAINMENT. Alternatively, the second computing device may be any computing device capable of communicating a virtual environment 612 to a mobile computing device 604.

The virtual environment 612, provided by the second computing device may be displayed on the mobile computing device 604. The virtual environment 612 may be an environment developed for user interaction through the second computing device 602. For example, the virtual environment 612 may be a three-dimensional map provided through an online computer program. Alternatively, the virtual environment 612 may be a mediated, or an augmented reality map of the real world with any number or variety of customizations. As an addition or alternative, the virtual environment 612 may be provided by a gaming console as part of, for example, a mobile game, mini game, an emergent game, etc.

Additionally, the mobile computing device 604 can be further configured to access saved data associated with the virtual environment 612 stored on the second computing device 602. The saved data may, for example, correspond to previous interactions by the user within the virtual environment 612. Similarly, the second computing device 602 can be further configured to convey the saved data to the mobile computing device 604, and congruently link the previous interactions within the virtual environment 612 to the mobile computing device 604. Thus, for example, a user playing a game having a virtual environment 612 on the second computing device 602, may save data associated with that game, and subsequently access the saved data using the mobile computing device 604, and utilize the self-propelled device 608 as a virtual character 610 (as shown in FIG. 6B) rendered upon the virtual environment 612.

Referring to FIG. 6B, the self-propelled device 608 may be controlled by the mobile computing device 604. As shown, the virtual entity 610 representing the self-propelled device 608 may be rendered on the mobile computing device 604 as an entity within the virtual environment 612. Additionally, the mobile computing device 604 may be configured to detect an event relating to the self-propelled device 608 in the real world and subsequently determine a virtual event based on the detected event. The virtual event may then be incorporated into the virtual environment 612. By way of example, as shown in FIG. 6B, the self-propelled device 608 may be represented as a winged dinosaur character in an augmented reality environment. The user of the mobile computing device 604 may move the dinosaur rendered on the mobile computing device 604 by maneuvering the self-propelled device 608 using controls 614. Furthermore, the mobile computing device 604 may further allow for a multitude of correlations between inputs for the self-propelled device 608 and virtual events for the virtual entity 610 corresponding to the self-propelled device 608.

Thus, in practice, the user may play a character anywhere in the real world by operating the self-propelled device 608 in a real world environment. A parallel augmented reality world may be displayed on the mobile computing device 608 with the virtual entity 610 in the virtual environment 612 corresponding to the self-propelled device 608. Using the controls 614 for the self-propelled device 608, the user can operate the self-propelled device 608 and arrange it to interact with the augmented reality environment 612 via the virtual entity 610.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with FIGS. below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units (such as CD or DVD units), flash memory (such as carried on many cell phones and tablets)), and magnetic memory. Computers, terminals, network enabled devices (e.g., mobile devices such as cell phones) are all examples of machines and devices that utilize processors, memory and instructions stored on computer-readable mediums. Additionally, embodiments may be implemented in the form of computer-programs, or a computer usable carrier medium capable of carrying such a program.

Although illustrative embodiments have been described in detail herein with reference to the accompanying drawings, variations to specific embodiments and details are encompassed by this disclosure. It is intended that the scope of the invention is defined by the following claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A method for operating a mobile computing device to control a remote controlled vehicle, the method being performed by one or more processors of the mobile computing device and comprising:
    in response to user inputs on a user interface generated on a display of the mobile computing device, transmitting control information to the remote controlled vehicle to control movement of the remote controlled vehicle in a real-world environment;
    interfacing with a second computing device that provides, via execution of a program by one or more processors of the second computing device, a virtual environment;
    transmitting position information, corresponding to the remote controlled vehicle, to the second computing device to cause the second computing device to render a virtual entity upon the virtual environment, the virtual entity representing the remote controlled vehicle moving in the real-world environment;
    receiving, from the second computing device, data corresponding to the virtual entity within the virtual environment; and
    displaying, on the display of the mobile computing device, the virtual environment including the virtual entity representing the remote controlled vehicle.

2. The method of claim 1, further comprising:
    detecting an event relating to the remote controlled vehicle in the real-world environment;
    determining a virtual event based on the detected event; and
    incorporating the virtual event into the virtual environment.

3. The method of claim 1, further comprising:
    accessing saved data associated with the virtual environment stored on the second computing device, the saved data corresponding to previous interactions within the virtual environment; and
    congruently linking the saved data to a current control session comprising the virtual environment and control of the remote controlled vehicle in the real-world environment.

4. The method of claim 3, wherein the previous interactions and the current control session of the remote controlled vehicle correspond to gameplay, simultaneously controlling the remote controlled vehicle in the real-world environment and the virtual entity within the virtual environment.

5. The method of claim 4, wherein the gameplay is associated with one or more of a minigame, emergent gameplay, or a mobile game.

6. The method of claim 1, wherein the virtual environment displayed on the mobile computing device is linked to a display of the virtual environment through the second computing device.

7. The method of claim 1, wherein the virtual environment corresponds to augmented reality.

8. The method of claim 1, wherein the mobile computing device is one or more of a smart phone, a tablet computer, or a laptop computer.

9. The method of claim 1, wherein interfacing with the second computing device is performed by the mobile computing device.

10. The method of claim 1, wherein the step of interfacing is performed by the second computing device.

11. A system comprising:
    a remote controlled vehicle; and
    a mobile computing device comprising one or more processors executing a set of instructions that cause the one or more processors to:
        in response to user inputs on a user interface generated on a display of the mobile computing device, transmit control information to the remote controlled vehicle to control movement of the remote controlled vehicle in a real-world environment;
        interface with a second computing device that provides, via execution of a program by one or more processors of the second computing device, a virtual environment;
        transmit position information, corresponding to the remote controlled vehicle, to the second computing device to cause the second computing device to render a virtual entity upon the virtual environment, the virtual entity representing the remote controlled vehicle moving in the real-world environment;
        receive, from the second computing device, data corresponding to the virtual entity within the virtual environment; and
        display, on the display of the mobile computing device, the virtual environment including the virtual entity representing the remote controlled vehicle.

12. The system of claim 11, wherein executed set of instructions further cause the one or more processors of the mobile computing device to:
    detect an event associated with the remote controlled vehicle in the real-world environment;
    determine a virtual event based on the detected event; and
    incorporate the virtual event in the virtual environment.

13. The system of claim 11, wherein the executed set of instructions further cause the one or more processors of the mobile computing device to:
    access saved data associated with the virtual environment stored on the second computing device, the saved data corresponding to previous interactions within the virtual environment.

14. The system of claim 13, wherein the executed set of instructions further cause the one or more processors of the mobile computing device to:
    congruently link the saved data to a current control session comprising the virtual environment and control of the remote controlled vehicle in the real-world environment.

15. The system of claim 14, wherein the previous interactions and the current control session correspond to gameplay within the virtual environment.

16. The system of claim 15, wherein the gameplay is associated with one or more of a minigame, emergent gameplay, or a mobile game.

17. The system of claim 11, wherein the virtual environment corresponds to augmented reality.

18. The system of claim 11, wherein the mobile computing device is one or more of a smart phone, a tablet computer, or a laptop computer.

19. The system of claim 11, wherein the mobile computing device performs one or more operations that enable the mobile computing device to interface with the second computing device.

20. The system of claim 11, wherein the second computing device performs one or more operations to interface with the mobile computing device.

21. A non-transitory computer readable medium storing instructions that, when executed by one or more processors of a mobile computing device, cause the one or more processors to:
   in response to user inputs on a user interface generated on a display of the mobile computing device, transmit control information to a remote controlled vehicle to control movement of the remote controlled vehicle in a real-world environment;
   interface with a second computing device that provides, via execution of a program by one or more processors of the second computing device, a virtual environment;
   transmit position information, corresponding to the remote controlled vehicle to the second computing device to cause the second computing device to render a virtual entity upon the virtual environment, the virtual entity representing the remote controlled vehicle in the real-world environment;
   receive, from the second computing device, data corresponding to the virtual entity within the virtual environment; and
   display, on the display of the mobile computing device, the virtual environment including the virtual entity representing the remote controlled vehicle.

22. The non-transitory computer readable medium of claim 21, wherein the executed instructions further cause the one or more processors to:
   detect an event relating to the remote controlled vehicle in the real-world environment;
   determine a virtual event based on the detected event; and
   incorporate the virtual event into the virtual environment.

23. The non-transitory computer readable medium of claim 21, wherein the instructions executed further cause the one or more processors to:
   access saved data associated with the virtual environment stored on the second computing device, the saved data corresponding to previous interactions within the virtual environment; and
   congruently link the saved data to a current control session comprising the virtual environment and control of the remote controlled vehicle in the real-world environment.

24. The non-transitory computer readable medium of claim 21, wherein the executed instructions further cause the one or more processors to:
   render the virtual environment as augmented reality.

* * * * *